US009229202B2

(12) United States Patent
Ikeda et al.

(10) Patent No.: US 9,229,202 B2
(45) Date of Patent: Jan. 5, 2016

(54) VARIABLE MAGNIFICATION OPTICAL SYSTEM AND IMAGING APPARATUS

(71) Applicant: FUJIFILM Corporation, Tokyo (JP)

(72) Inventors: Shinkichi Ikeda, Saitama-ken (JP); Yasutaka Shimada, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/170,024

(22) Filed: Jan. 31, 2014

(65) Prior Publication Data

US 2014/0146397 A1    May 29, 2014

Related U.S. Application Data

(63) Continuation of application No. PCT/JP2012/005444, filed on Aug. 29, 2012.

(30) Foreign Application Priority Data

Aug. 30, 2011  (JP) ................................. 2011-187421

(51) Int. Cl.
*G02B 15/14* (2006.01)
*G02B 15/10* (2006.01)
(Continued)

(52) U.S. Cl.
CPC ............... *G02B 15/14* (2013.01); *G02B 15/10* (2013.01); *G02B 13/18* (2013.01); *G02B 15/167* (2013.01); *G02B 15/20* (2013.01)

(58) Field of Classification Search
CPC ............... G02B 15/00–15/28; G02B 13/0095; G02B 21/361
USPC .......................................... 359/674, 676–706
See application file for complete search history.

(56) References Cited

U.S. PATENT DOCUMENTS 4,775,228 A    10/1988 Ikemori et al.
5,097,360 A *  3/1992 Fukami et al. ................ 359/674
(Continued)

FOREIGN PATENT DOCUMENTS

JP    61-91613    5/1986
JP    63-17423    1/1988
(Continued)

OTHER PUBLICATIONS

International Search Report, PCT/JP2012/005444, Dec. 11, 2012.
(Continued)

*Primary Examiner* — Scott J Sugarman
*Assistant Examiner* — Gary O'Neill
(74) *Attorney, Agent, or Firm* — Young & Thompson

(57) ABSTRACT

A variable magnification optical system includes a relay lens group (a fifth lens group) substantially consisting of a relay front group and a relay rear group with a predetermined air space therebetween, and which is fixed during magnification change and has image formation action, and an extender lens group insertably and detachably arranged between the relay front group and the relay rear group, and which extends a focal length toward a telephoto side without changing an image formation position. The extender lens group substantially consists of a first lens group having positive refractive power and a second lens group having negative refractive power in this order from an object side. The second lens group is a cemented lens substantially consisting of a convex meniscus lens, a biconcave lens and a convex meniscus lens in this order from the object side.

12 Claims, 16 Drawing Sheets

(51) Int. Cl.
*G02B 13/18* (2006.01)
*G02B 15/167* (2006.01)
*G02B 15/20* (2006.01)

(56) References Cited

U.S. PATENT DOCUMENTS

| | | | |
|---|---|---|---|
| 6,965,481 | B2 | 11/2005 | Tomita et al. |
| 2001/0004297 | A1* | 6/2001 | Suzuki .................. 359/365 |
| 2005/0099699 | A1 | 5/2005 | Nurishi |

FOREIGN PATENT DOCUMENTS

| | | |
|---|---|---|
| JP | 07-325252 | 12/1995 |
| JP | 08-297244 | 11/1996 |
| JP | 3513264 | 1/2004 |
| JP | 2004-126631 | 4/2004 |
| JP | 2011-075646 | 4/2011 |

OTHER PUBLICATIONS

CN Office Action dated Jul. 28, 2015, with English Translation; Application No. 201280042003.0.

* cited by examiner

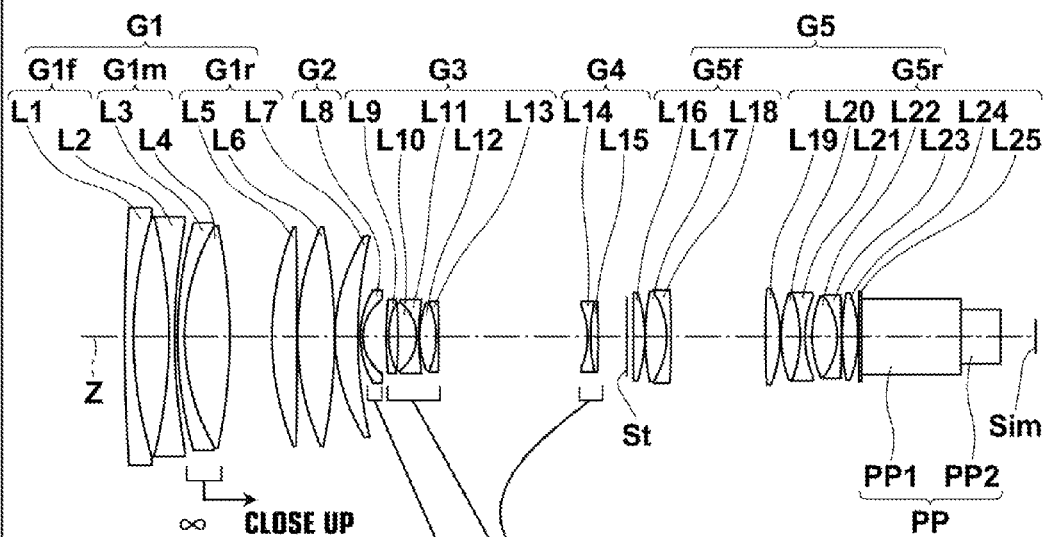
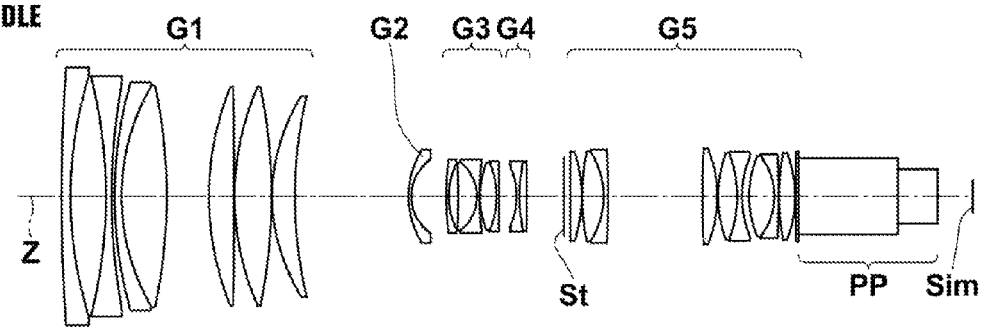
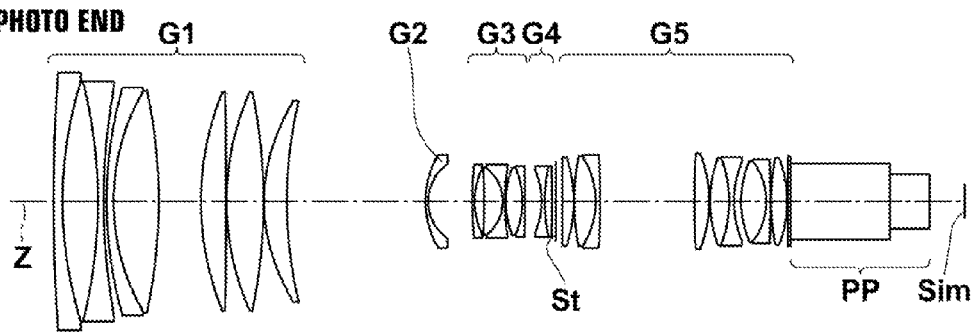
FIG.1

FIG.2
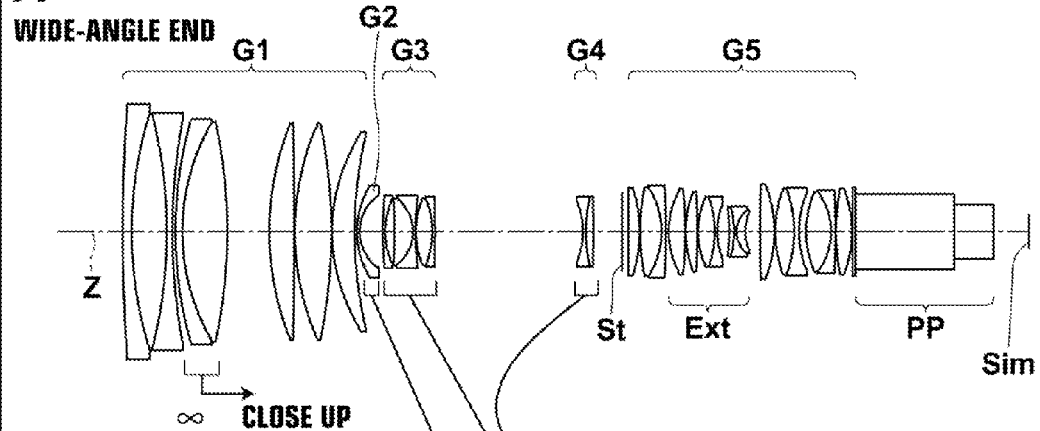
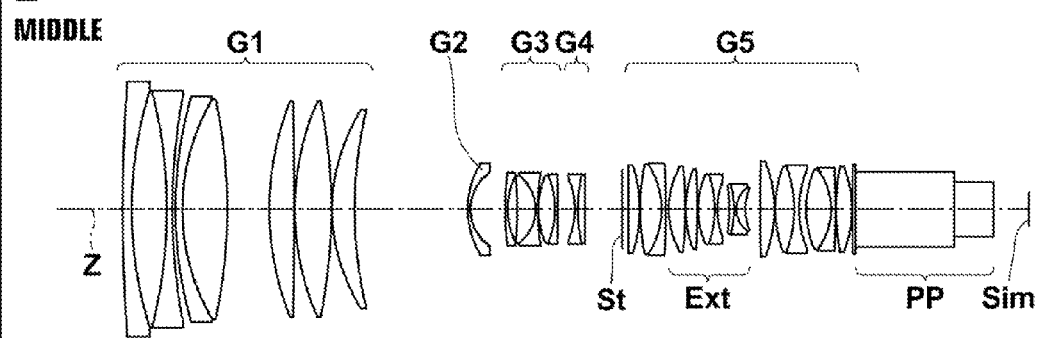
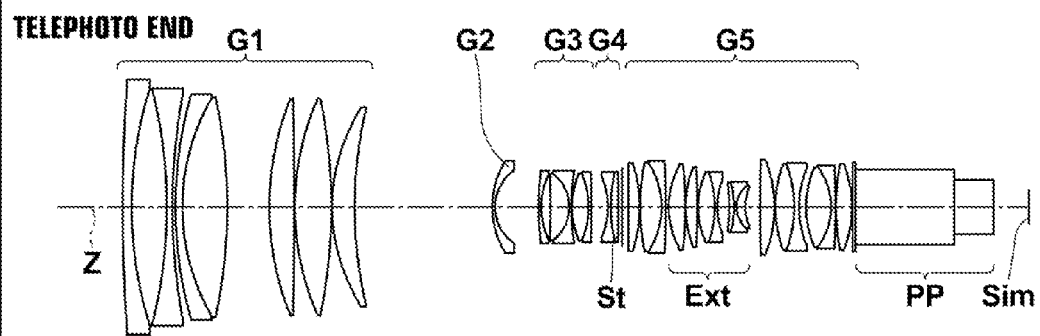

FIG.5
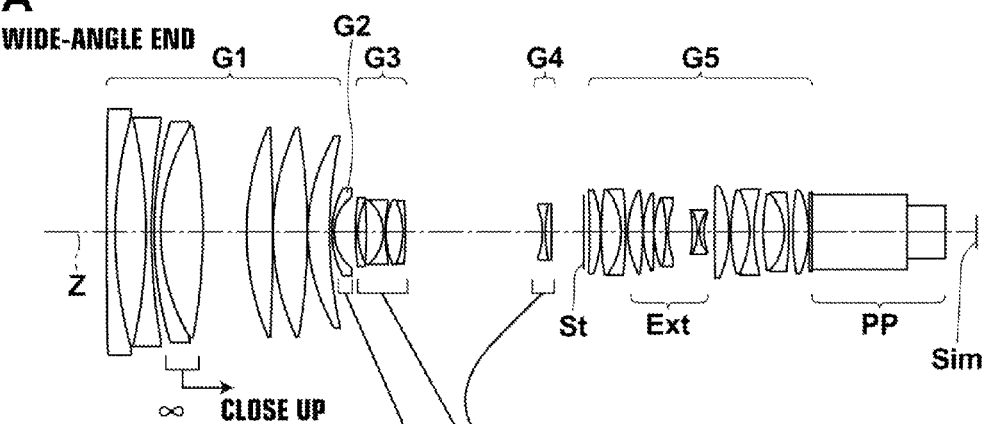
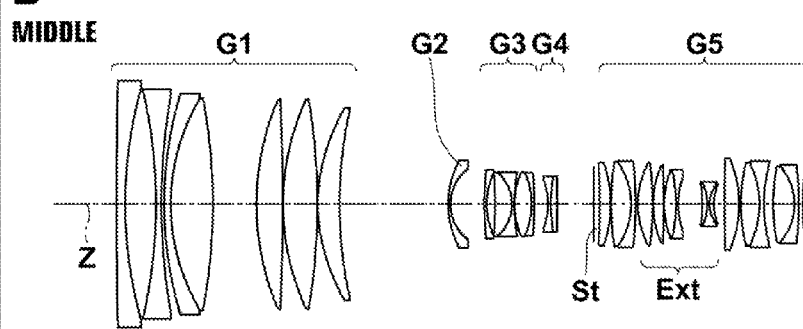
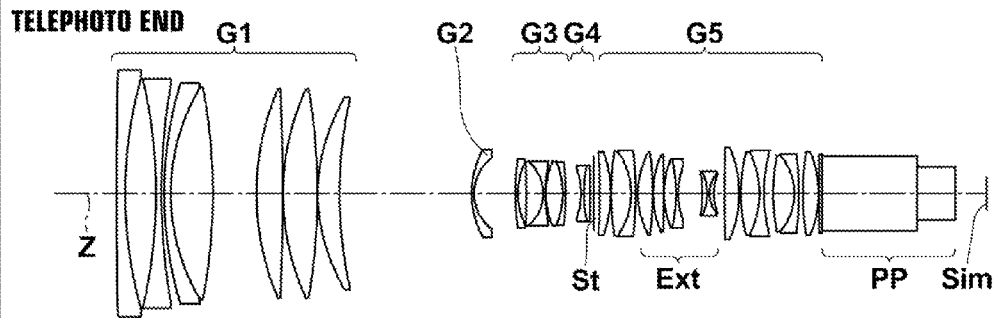

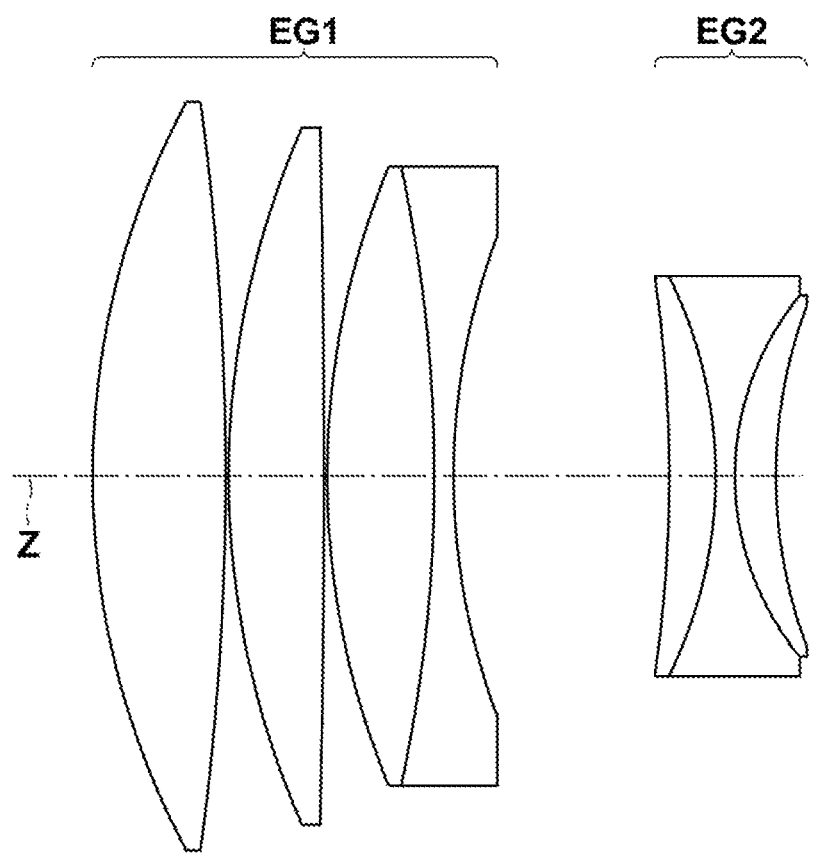

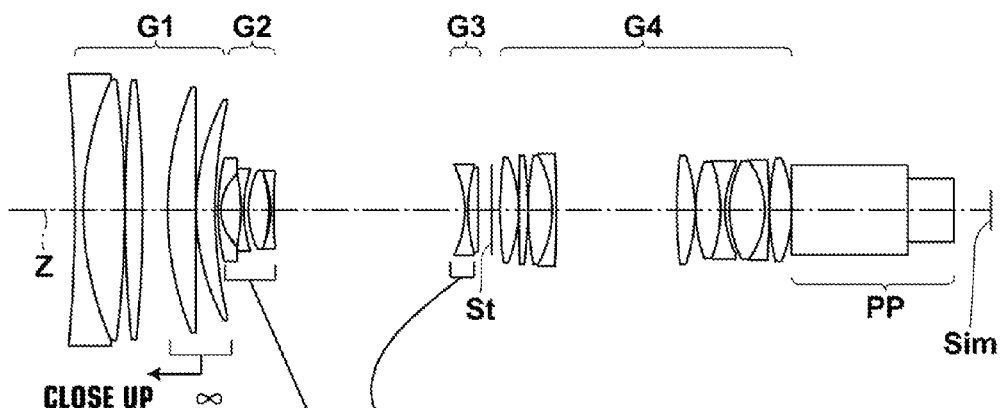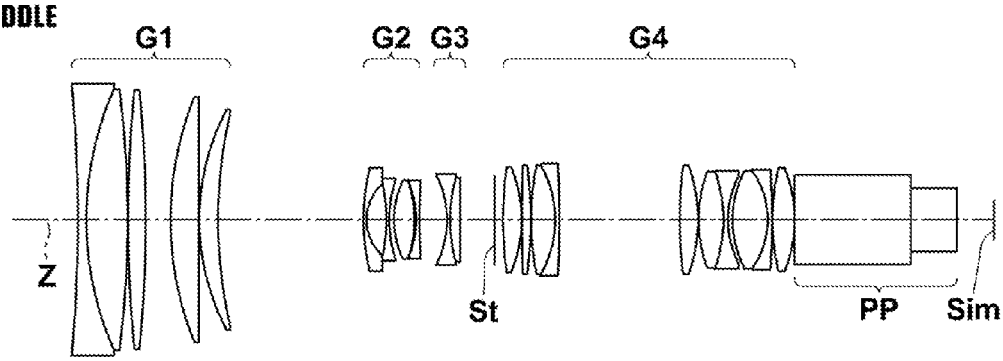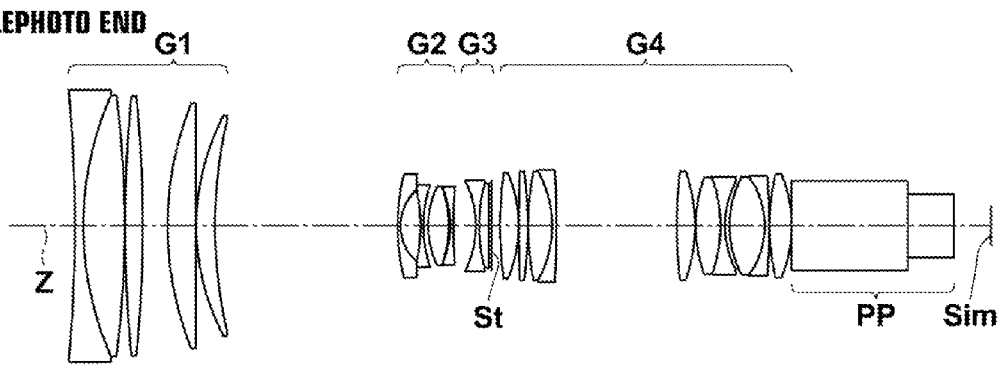
FIG.7 EXAMPLE 3

FIG.8
EXAMPLE 3 AFTER INSERTING EXTENDER LENS GROUP
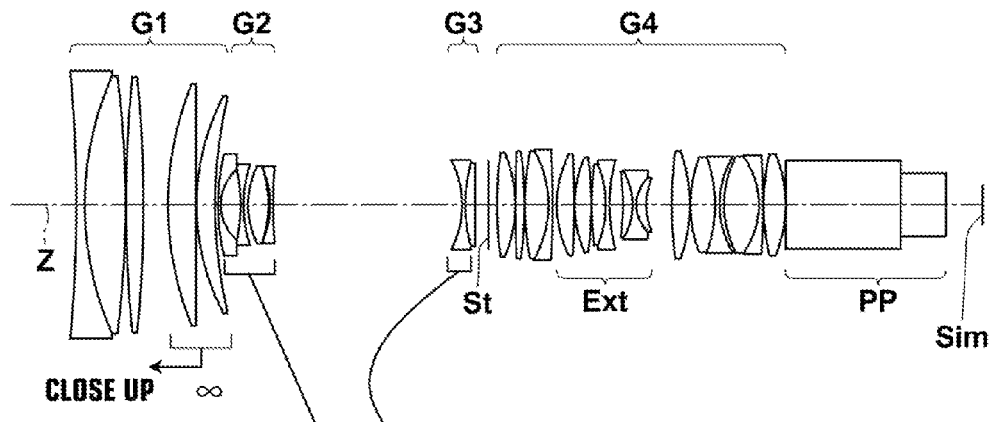
A WIDE-ANGLE END
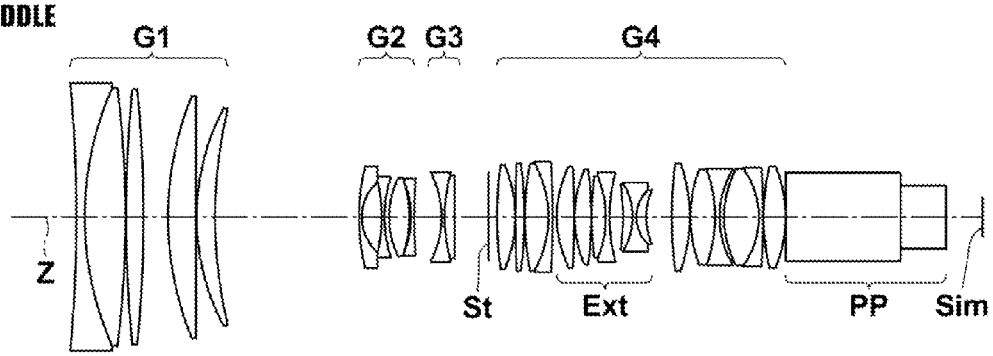
B MIDDLE
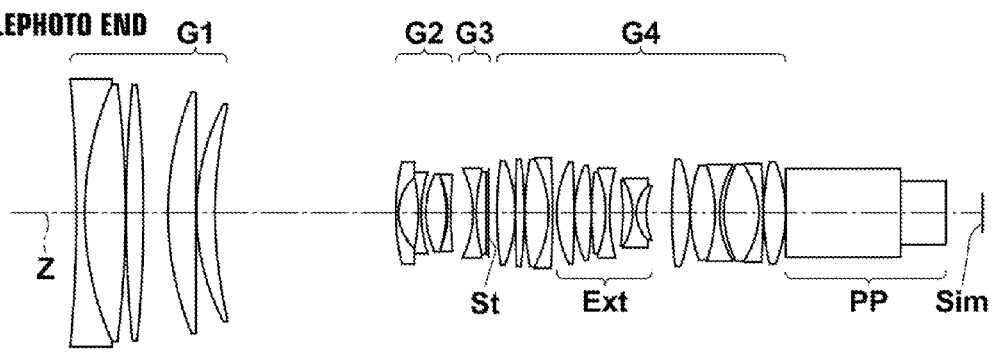
C TELEPHOTO END

EXAMPLE 3

FIG.11
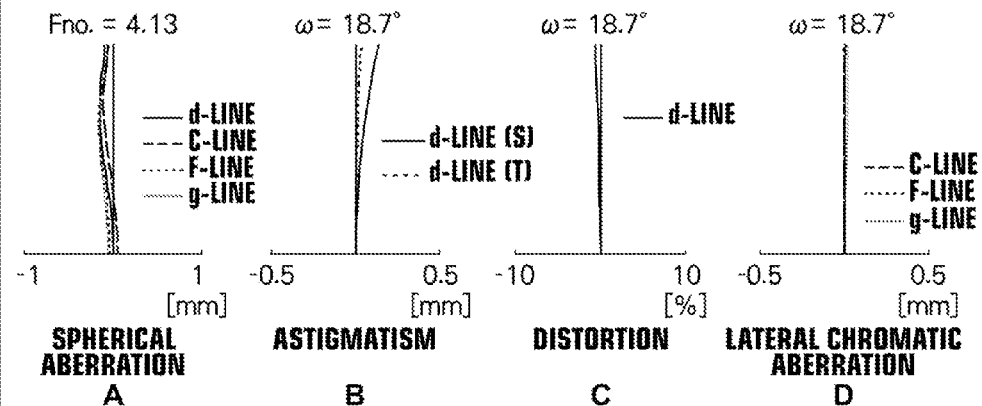
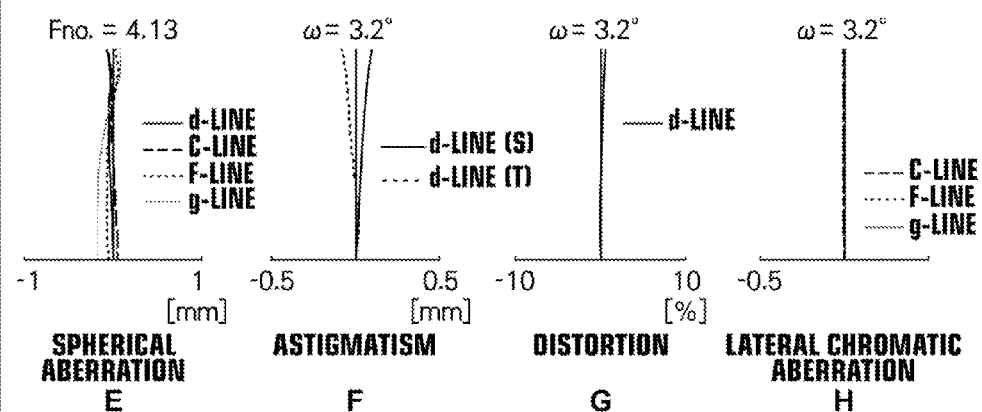
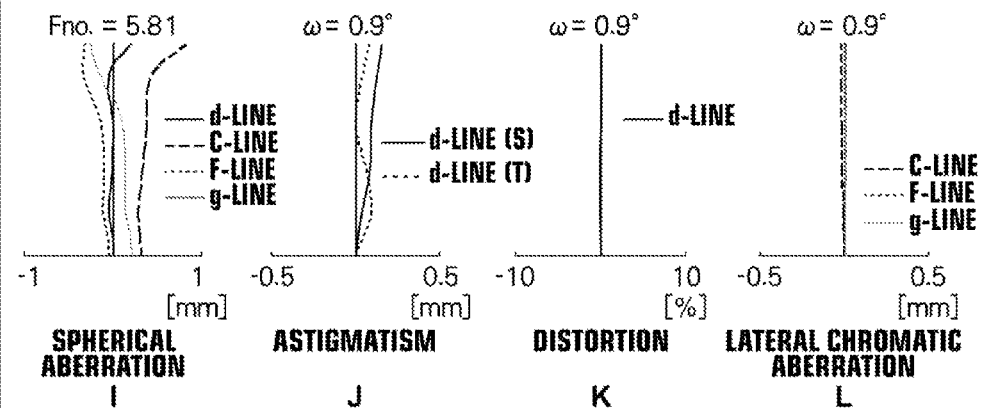

FIG.13
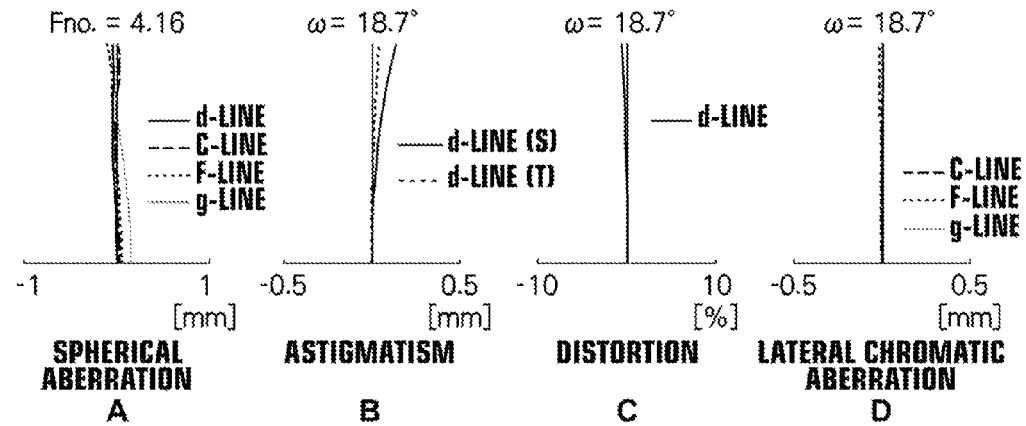
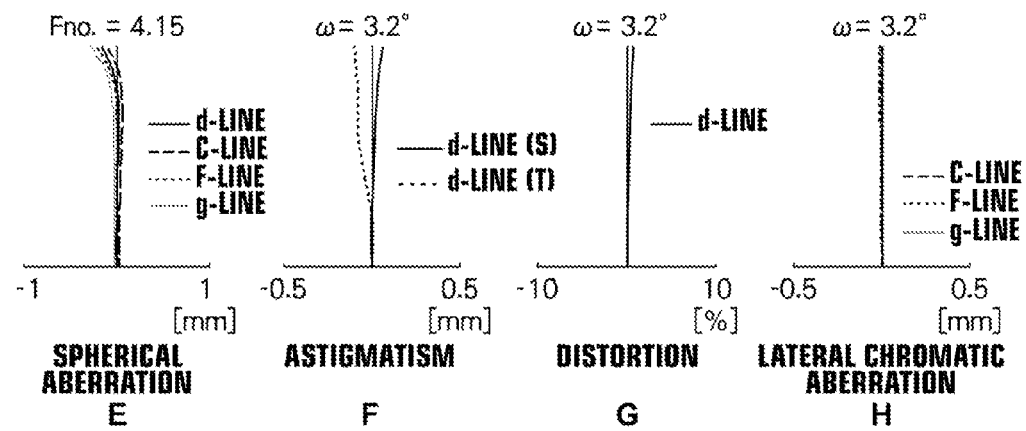
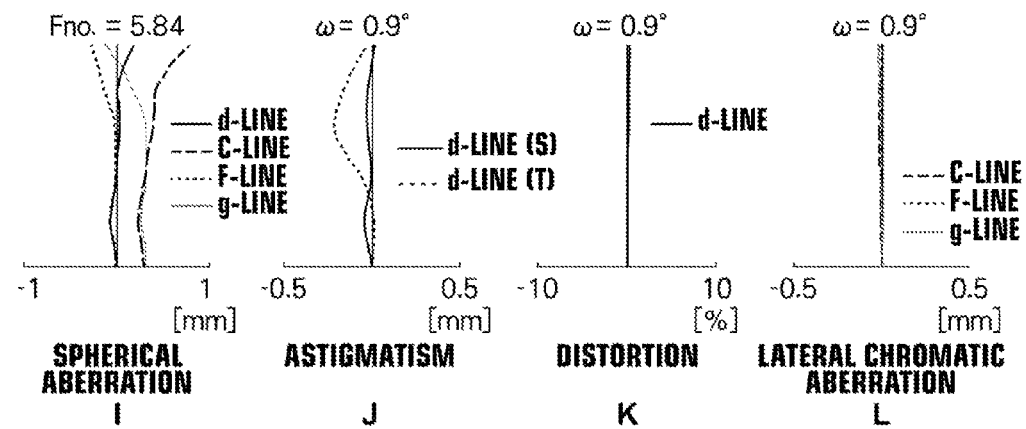

FIG.15
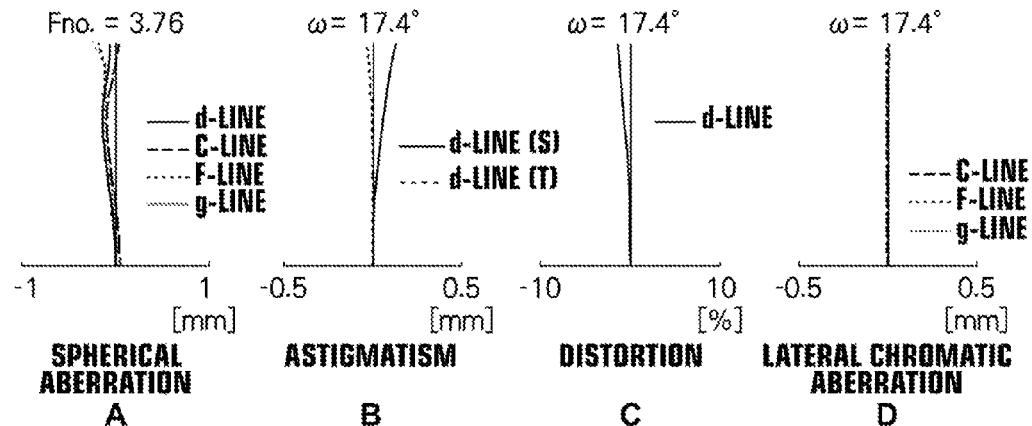
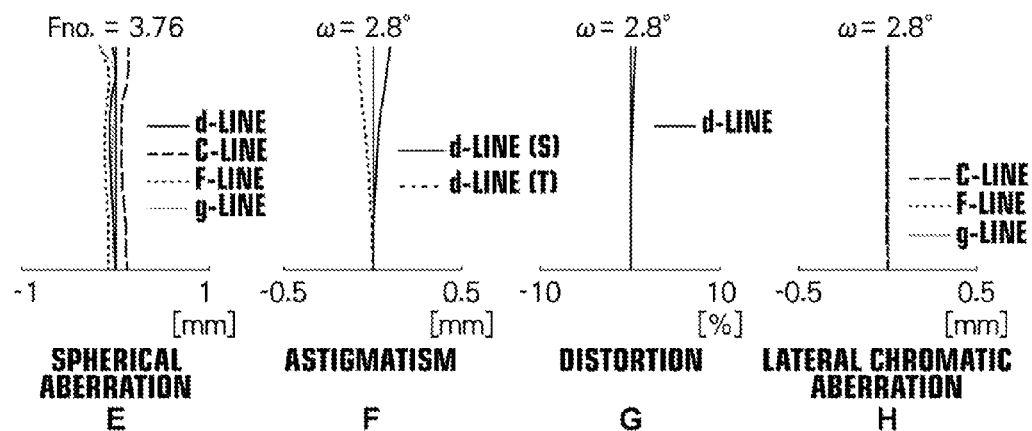
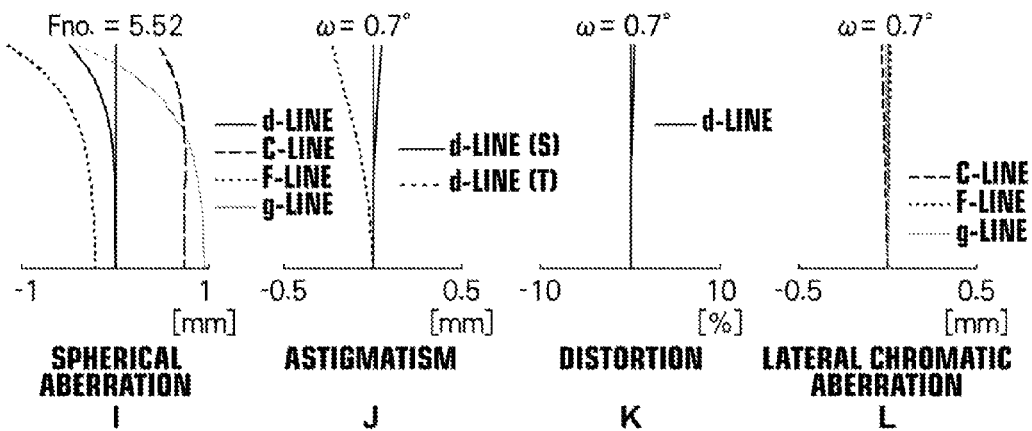

VARIABLE MAGNIFICATION OPTICAL SYSTEM AND IMAGING APPARATUS

CROSS REFERENCE TO RELATED APPLICATIONS

This application is a continuation of PCT/JP2012/005444 filed on Aug. 29, 2012, which claims foreign priority to Japanese Application No. 2011-187421 filed on Aug. 30, 2011. The entire contents of each of the above applications are hereby incorporated by reference.

BACKGROUND OF THE INVENTION

1. Field of the Invention

The present invention relates to a variable magnification optical system and an imaging apparatus. In particular, the present invention relates to a variable magnification optical system usable in a video camera, an electronic still camera and the like, and appropriate especially for a surveillance camera, and also to an imaging apparatus including the variable magnification optical system.

2. Description of the Related Art

Conventionally, variable magnification optical systems for CCTV (Closed-circuit Television) were developed, as optical systems for imaging apparatuses, such as a video camera, an electronic still camera, and a surveillance camera, which use imaging devices, such as a CCD (Charge Coupled Device) and a CMOS (Complementary Metal Oxide Semiconductor), as recording media.

As such variable magnification optical systems for CCTV, an optical system with a built-in extender, which can extend the focal length of the optical system toward a telephoto side, has been proposed (please refer, for example, to Japanese Unexamined Patent Publication No. 7(1995)-325252 (Patent Document 1), U.S. Pat. No. 6,965,481 (Patent Document 2), Japanese Unexamined Patent Publication No. 2004-126631 (Patent Document 3), and U.S. Patent Application Publication No. 20050099699 (Patent Document 4)).

SUMMARY OF THE INVENTION

In Patent Document 1, an aspheric lens is used to efficiently correct a spherical aberration. Therefore, the number of lenses is reduced, and the size of a lens system is reduced. However, a lateral chromatic aberration is not improved.

In Patent Document 2 and Patent Document 3, disclosure about a lateral chromatic aberration is insufficient. Further, the lens has a known structure in which the condition of the lateral chromatic aberration is not deemed excellent. Therefore, the lateral chromatic aberration is not improved.

In Patent Document 4, the lens structure is also a known structure in which the condition of the lateral chromatic aberration is not deemed excellent. Further, a variable magnification ratio is small, compared with the variable magnification optical system of the present invention. Therefore, the lateral chromatic aberration is not sufficiently managed.

In view of the foregoing circumstances, it is an object of the present invention to provide a variable magnification optical system that can excellently correct a lateral chromatic aberration when an extender has been inserted, and an imaging apparatus including the variable magnification optical system.

A variable magnification optical system of the present invention is a variable magnification optical system comprising:

a relay lens group substantially consisting of a relay front group and a relay rear group with a predetermined air space therebetween, and which is fixed during magnification change and has image formation action; and an extender lens group insertably and detachably arranged between the relay front group and the relay rear group, and which extends a focal length toward a telephoto side without changing an image formation position, wherein the extender lens group substantially consists of first lens group EG1 having positive refractive power and second lens group EG2 having negative refractive power in this order from an object side, and wherein second lens group EG2 is a cemented lens substantially consisting of convex meniscus lens EL21, biconcave lens EL22 and convex meniscus lens EL23 in this order from the object side.

In the variable magnification optical system of the present invention, it is desirable that the following conditional formulas (1) and (2) are satisfied when an average refractive index of convex meniscus lens EL21 and convex meniscus lens EL23 is n213 and the refractive index of biconcave lens EL22 is n22:

$$1.7 < n213 \qquad (1); \text{ and}$$

$$1.7 < n22 \qquad (2).$$

In the variable magnification optical system of the present invention, it is desirable that the following conditional formulas (3) and (4) are satisfied when an average Abbe number of convex meniscus lens EL21 and convex meniscus lens EL23 is ν213 and the Abbe number of biconcave lens EL22 is ν22:

$$\nu 213 < 30 \qquad (3); \text{ and}$$

$$40 < \nu 22 \qquad (4).$$

Further, it is desirable that first lens group EG1 in the variable magnification optical system of the present invention substantially consists of biconvex lens EL11 having strong refractive power toward the object side, positive lens EL12, positive lens EL13 and biconcave lens EL14 in this order from the object side, and that positive lens EL13 and biconcave lens EL14 are cemented together.

In the variable magnification optical system of the present invention, it is desirable that the following conditional formula (5) is satisfied when an average Abbe number of biconvex lens EL11, positive lens EL12, and positive lens EL13 is ν1p:

$$65 < \nu 1p \qquad (5).$$

Here, the sign of the refractive power and the surface shape of each of the aforementioned lenses are considered in a paraxial region when the lens is an aspheric lens.

In the above descriptions, the number of lenses is the number of lenses, as composition elements. For example, when plural single lenses made of different materials from each other are cemented together to form a cemented lens, the number of the single lenses constituting the cemented lens is counted.

The expression "biconvex lens (EL11) having strong refractive power toward the object side" means that the absolute value of the curvature radius of an object-side surface is less than the absolute value of the curvature radius of an image-side surface.

Further, the term "convex meniscus lens" refers to a meniscus lens having positive refractive power.

An imaging apparatus of the present invention includes a variable magnification optical system of the present invention, as described above.

The variable magnification optical system of the present invention includes a relay lens group substantially consisting of a relay front group and a relay rear group with a predetermined air space therebetween, and which is fixed during magnification change and has image formation action, and an extender lens group insertably and detachably arranged between the relay front group and the relay rear group, and which extends a focal length toward a telephoto side without changing an image formation position. Further, the extender lens group substantially consists of first lens group EG1 having positive refractive power and second lens group EG2 having negative refractive power in this order from an object side, and second lens group EG2 is a cemented lens substantially consisting of convex meniscus lens EL21, biconcave lens EL22 and convex meniscus lens EL23 in this order from the object side. Therefore, it is possible to excellently correct a lateral chromatic aberration when the extender lens group has been inserted.

Further, the imaging apparatus of the present invention includes the variable magnification optical system of the present invention. Therefore, it is possible to obtain images with high image qualities, in which lateral chromatic aberrations have been excellently corrected.

BRIEF DESCRIPTION OF THE DRAWINGS

FIG. 1, Sections A through C are cross sections illustrating the lens structure of a variable magnification optical system according to an embodiment of the present invention (also Example 1) before an extender lens group is inserted;

FIG. 2, Sections A through C are cross sections illustrating the lens structure of the variable magnification optical system according to an embodiment of the present invention (also Example 1) after the extender lens group is inserted;

FIG. 5, Sections A through C are cross sections illustrating the lens structure of the variable magnification optical system in Example 2 of the present invention after the extender lens group is inserted;

FIG. 6 is a cross section illustrating the lens structure of the extender lens group in the variable magnification optical system in Example 2 of the present invention;

FIG. 7, Sections A through C are cross sections illustrating the lens structure of a variable magnification optical system in Example 3 of the present invention before an extender lens group is inserted;

FIG. 8, Sections A through C are cross sections illustrating the lens structure of the variable magnification optical system in Example 3 of the present invention after the extender lens group is inserted;

FIG. 11, Sections A through L are aberration diagrams of the variable magnification optical system in Example 1 of the present invention after the extender lens group is inserted;

FIG. 13, Sections A through L are aberration diagrams of the variable magnification optical system in Example 2 of the present invention after the extender lens group is inserted;

FIG. 15, Sections A through L are aberration diagrams of the variable magnification optical system in Example 3 of the present invention after the extender lens group is inserted.

DESCRIPTION OF THE PREFERRED EMBODIMENTS

Figure 3:
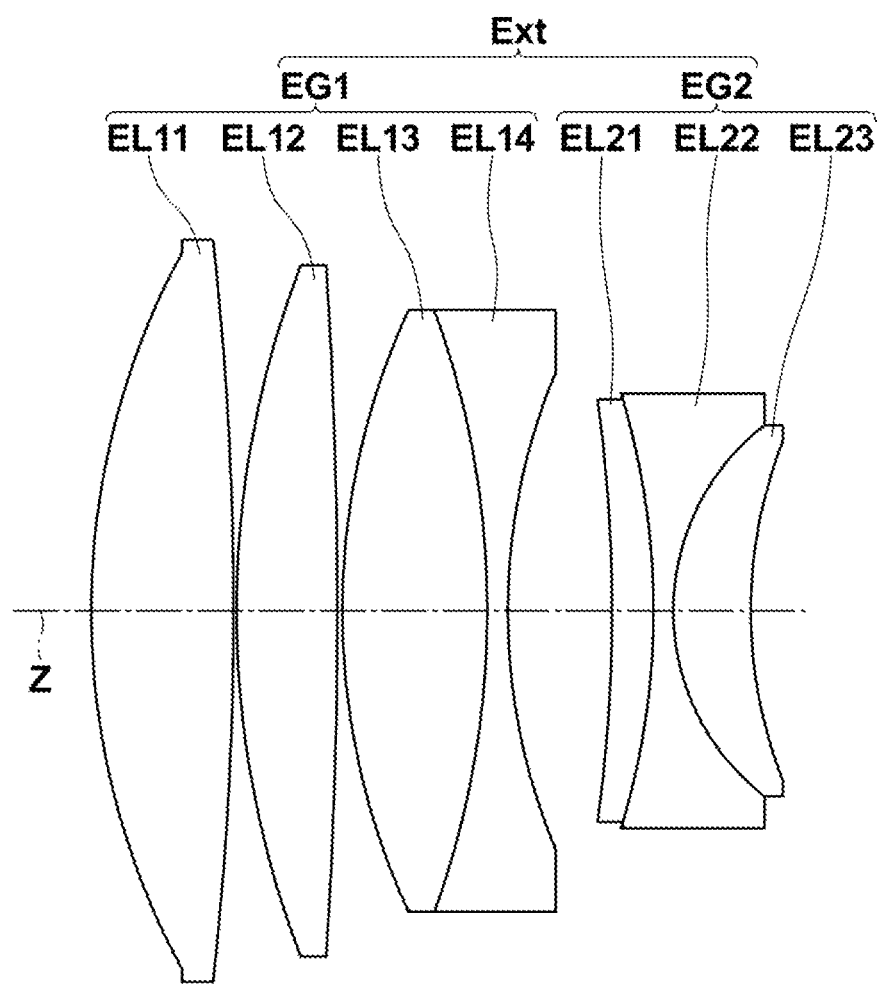
FIG. 3 is a cross section illustrating the lens structure of the extender lens group in the variable magnification optical system according to an embodiment of the present invention (also Example 1)

Embodiments of the present invention will be described in detail with reference to drawings. FIG. 1, Sections A through C are cross sections illustrating a structure example of a variable magnification optical system according to an embodiment of the present invention (also Example 1) before an extender lens group is inserted. FIG. 2, Sections A through C are cross sections illustrating a structure example of the variable magnification optical system according to an embodiment of the present invention (also Example 1) after the extender lens group is inserted. FIG. 3 is a cross section illustrating the lens structure of the extender lens group in the variable magnification optical system according to an embodiment of the present invention (also Example 1). The structure example illustrated in FIG. 1 through FIG. 3 is also the structure of a variable magnification optical system in Example 1, which will be described later. In FIG. 1 through FIG. 3, the left side is the object side, and the right side is the image side.

This variable magnification optical system consists of first lens group G1 having positive refractive power, and which is fixed during magnification change, second lens group G2 having negative refractive power, third lens group G3 having negative refractive power, fourth lens group G4 having negative refractive power, aperture stop St, which is fixed during magnification change, and fifth lens group G5 having positive refractive power, and which is fixed during magnification change, which are in this order from an object side along optical axis Z. Further, second lens group G2, third lens group G3 and fourth lens group G4 move in such a manner that a distance between first lens group G1 and second lens group G2 constantly becomes longer and a distance between second lens group G2 and third lens group G3 constantly becomes longer, compared with a wide-angle end, and a distance between third lens group G3 and fourth lens group G4 changes and a distance between fourth lens group G4 and fifth lens group G5 changes when magnification is changed from the wide-angle end to a telephoto end. Here, aperture stop St illustrated in FIG. 1 does not necessarily represent the size nor the shape of aperture stop St, but the position of aperture stop St on optical axis Z.

When this variable magnification optical system is applied to an imaging apparatus, it is desirable to arrange a cover glass, a prism, and various filters, such as an infrared ray cut filter and a low-pass filter, between the optical system and image plane Sim based on the structure of the camera side on which the lens is mounted. Therefore, FIG. 1 illustrates an example in which parallel-flat-plate-shaped optical members PP1 and PP2, which are assumed to be such elements, are arranged between fifth lens group G5 and image plane Sim.

Further, fifth lens group G5, which is a relay lens group, consists of relay front group G5f and relay rear group G5r with a predetermined air space therebetween. As illustrated in FIG. 2, fifth lens group G5 is structured so that extender lens group Ext can be insertably and detachably arranged between relay front group G5f and relay rear group G5r.

As illustrated in FIG. 3, this extender lens group Ext consists of first lens group EG1 having positive refractive power and second lens group EG2 having negative refractive power in this order from an object side, and second lens group EG2 is a cemented lens consisting of convex meniscus lens EL21, biconcave lens EL22 and convex meniscus lens EL23 in this order from the object side.

When extender lens group Ext is inserted to extend a focal length toward a telephoto side, this structure can make it possible to correct chromatic aberrations both on the object side of biconcave lens EL22 and on the image side of biconcave lens EL22. Therefore, it is possible to suppress lateral chromatic aberrations that will increase in the entire zoom range.

Further, the variable magnification optical system according to an embodiment of the present invention satisfies the following conditional formulas (1) and (2) when an average refractive index of convex meniscus lens EL21 and convex meniscus lens EL23 is n213 and the refractive index of biconcave lens EL22 is n22. Therefore, it is possible to more excellently suppress a lateral chromatic aberration. If the value is lower than the lower limit of conditional formula (1), a curvature increases, and it becomes impossible to suppress astigmatism. Here, a refractive index on a short wavelength side tends to deteriorate when the refractive index of a lens becomes higher. Therefore, it is more desirable that the following conditional formula (1-1) is satisfied. Further, if the value is lower than the lower limit of conditional formula (2), a curvature increases, and it becomes impossible to suppress astigmatism.

$$1.7 < n213 \quad (1);$$

$$1.7 < n213 < 1.9 \quad (1\text{-}1); \text{ and}$$

$$1.7 < n22 \quad (2).$$

Further, the variable magnification optical system according to an embodiment of the present invention satisfies the following conditional formulas (3) and (4) when an average Abbe number of convex meniscus lens EL21 and convex meniscus lens EL23 is ν213 and the Abbe number of biconcave lens EL22 is ν22. Therefore, it is possible to more excellently suppress a lateral chromatic aberration. Here, if the value exceeds the upper limit of conditional formula (3) or is lower than the lower limit of conditional formula (4), a high refractive index is necessary to correct a lateral chromatic aberration and a longitudinal chromatic aberration. Therefore, a curvature increases. Consequently, it becomes impossible to suppress astigmatism.

$$\nu213 < 30 \quad (3); \text{ and}$$

$$40 < \nu22 \quad (4)$$

Further, in the variable magnification optical system according to an embodiment of the present invention, first lens group EG1 in extender lens group Ext consists of biconvex lens EL11 having strong refractive power toward the object side, biconvex lens EL12, biconvex lens EL13 and biconcave lens EL14 in this order from the object side. Further, biconvex lens EL13 and biconcave lens EL14 are cemented together. A spherical aberration and curvature of field in a sagittal direction tend to deteriorate when a focal length is extended. However, since an increase of aberrations can be suppressed by continuously arranging, on the object side, surfaces that make rays converge, as described above, it is possible to excellently correct a spherical aberration and curvature of field in a sagittal direction.

Further, in the variable magnification optical system according to an embodiment of the present invention, the following conditional formula (5) is satisfied when an average Abbe number of biconvex lens EL11, biconvex lens EL12 and biconvex lens EL13 is ν1p. Therefore, it is possible to suppress a longitudinal chromatic aberration at a telephoto end. If the value is lower than the lower limit of conditional formula (5), dispersion increases. Therefore, large chromatic aberrations are generated when rays are caused to converge. Consequently, it becomes difficult to sufficiently suppress a longitudinal chromatic aberration.

$$65 < \nu1p \quad (5)$$

In the variable magnification optical system according to an embodiment of the present invention, it is desirable that glass is used as a specific material arranged on the most object-side. Alternatively, a transparent ceramic may be used.

As the material of a lens on which an aspherical shape is formed, glass may be used. Alternatively, plastic may be used. When plastic is used, it is possible to reduce the weight and the cost of the lens.

When the variable magnification optical system according to an embodiment of the present embodiment is used in tough conditions, it is desirable that a multi-layer coating for protection is applied. Besides the coating for protection, an antireflection coating for reducing ghost light or the like in usage may be applied.

In the example illustrated in FIG. 1, optical members PP1 and PP2 are arranged between the lens system and image plane Sim. Instead of arranging various filters, such as a low-pass filter and a filter that cuts a specific wavelength band, or the like, the various filters may be arranged between lenses. Alternatively, a coating having similar action to that of various filters may be applied to a lens surface of one of the lenses.

Next, numerical value examples of the variable magnification optical system of the present invention will be described. FIG. 1, Sections A, B and C illustrate arrangement of lenses of the variable magnification optical system in Example 1 at a wide-angle end, in a middle focal length state and at a telephoto end, respectively, before an extender lens group is inserted. FIG. 2, Sections A, B and C illustrate arrangement of lenses of the variable magnification optical system in Example 1 at a wide-angle end, in a middle focal length state and at a telephoto end, respectively, after the extender lens group is inserted. FIG. 3 illustrates the lens structure of the extender lens group in the variable magnification optical system of Example 1. In Example 1, fifth lens group G5 is a relay lens group, and extender lens group Ext is insertably and detachably arranged in fifth lens group G5.

Figure 4:
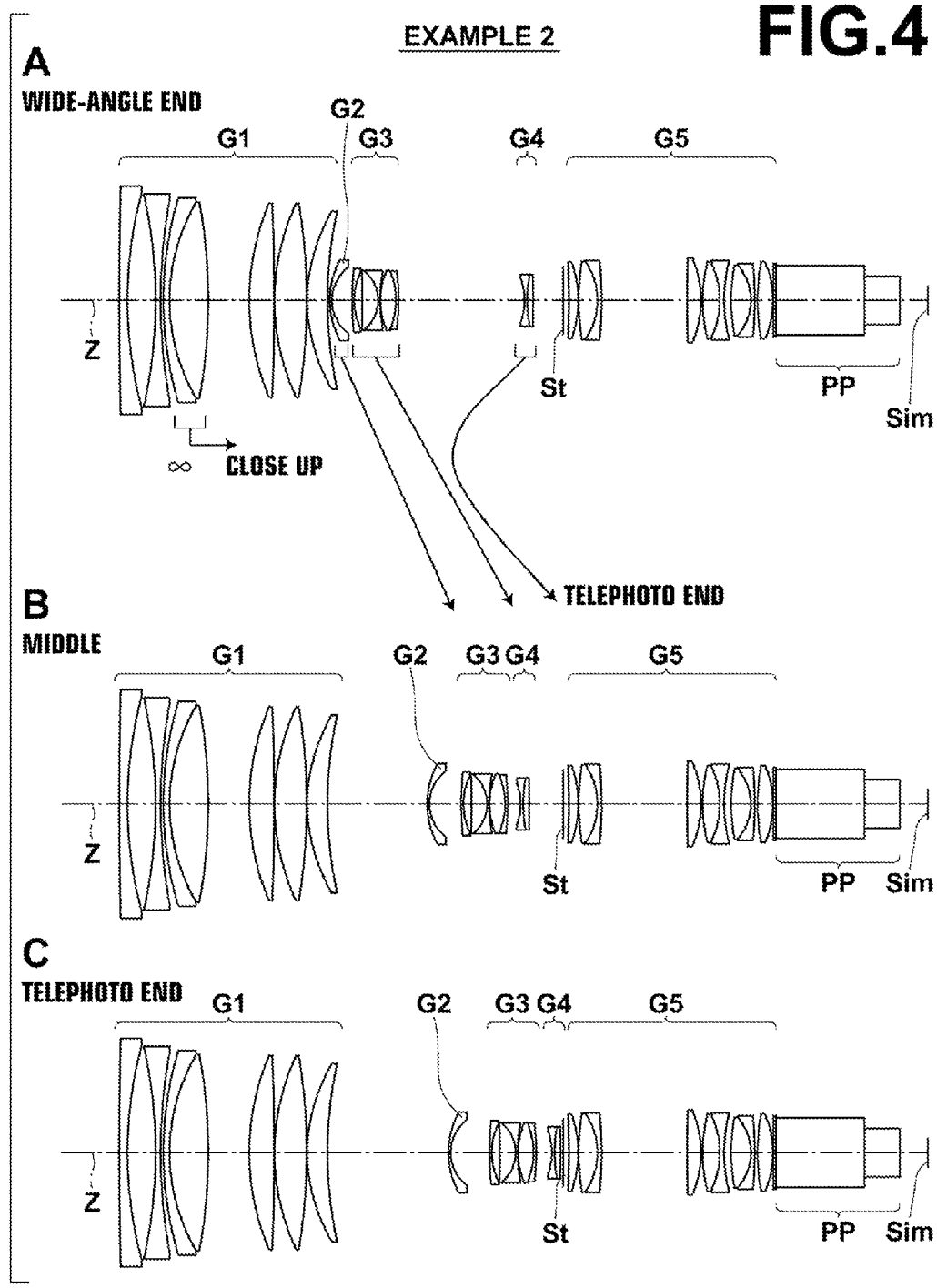
FIG. 4, Sections A through C are cross sections illustrating the lens structure of a variable magnification optical system in Example 2 of the present invention before an extender lens group is inserted.

FIG. 4, Sections A, B and C illustrate arrangement of lenses of the variable magnification optical system in Example 2 at a wide-angle end, in a middle focal length state and at a telephoto end, respectively, before an extender lens group is inserted. FIG. 5, Sections A, B and C illustrate arrangement of lenses of the variable magnification optical system in Example 2 at a wide-angle end, in a middle focal length state and at a telephoto end, respectively, after the extender lens group is inserted. FIG. 6 illustrates the lens structure of the extender lens group in the variable magnification optical system of Example 2. In Example 2, fifth lens group G5 is a relay lens group, and extender lens group Ext is insertably and detachably arranged in fifth lens group G5.

Figure 9:
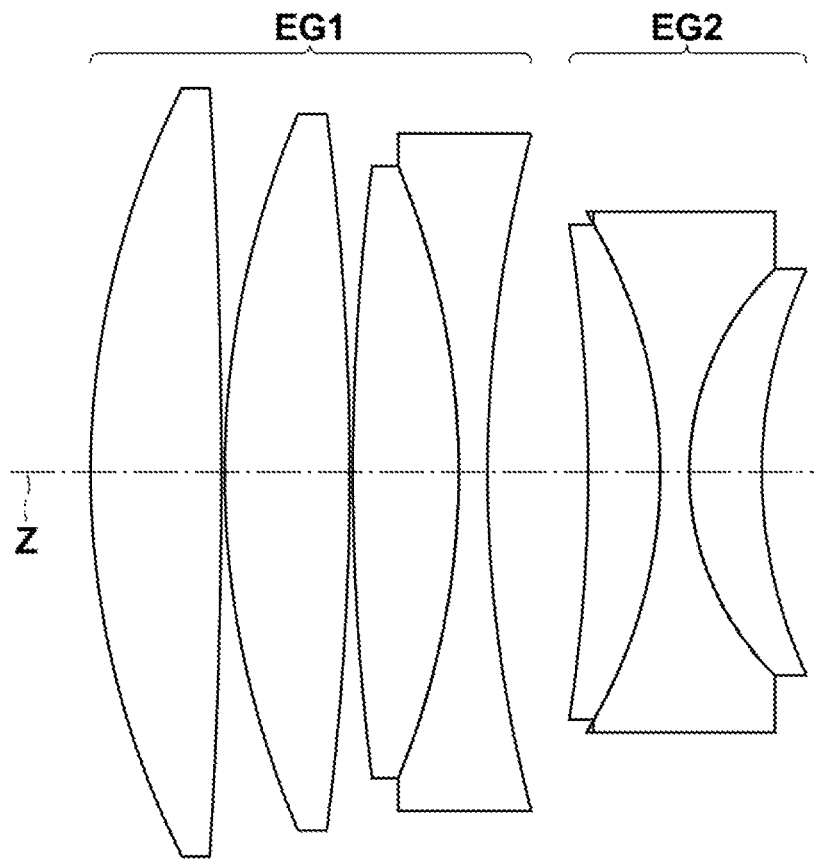
FIG. 9 is a cross section illustrating the lens structure of the extender lens group in the variable magnification optical system in Example 3 of the present invention.

FIG. 7, Sections A, B and C illustrate arrangement of lenses of the variable magnification optical system in Example 3 at a wide-angle end, in a middle focal length state and at a telephoto end, respectively, before an extender lens group is inserted. FIG. 8, Sections A, B and C illustrate arrangement of lenses of the variable magnification optical system in Example 3 at a wide-angle end, in a middle focal length state and at a telephoto end, respectively, after the extender lens group is inserted. FIG. 9 illustrates the lens structure of the extender lens group in the variable magnification optical system of Example 3. In Example 3, fourth lens group G4 is a relay lens group, and extender lens group Ext is insertably and detachably arranged in fourth lens group G4.

In FIG. 1 through FIG. 9, optical member PP is also illustrated, and the left side is the object side, and the right side is the image side. The illustrated aperture stop St does not necessarily represent the size nor the shape of aperture stop St, but represents the position of aperture stop St on optical axis Z.

Table 1 shows basic lens data about a variable magnification optical system in Example 1. Table 2 shows data about an extender lens group. Table 3 shows data about variable magnification. Table 4 shows data about focus. Table 5 and Table 6 show aspherical surface data.

Table 7 shows basic lens data about a variable magnification optical system in Example 2. Table 8 shows data about an extender lens group. Table 9 shows data about variable magnification. Table 10 shows data about focus. Table 11 and Table 12 show aspherical surface data.

Table 13 shows basic lens data about a variable magnification optical system in Example 3. Table 14 shows data about an extender lens group. Table 15 shows data about variable magnification. Table 16 shows data about focus.

Next, the meanings of signs in the tables will be described, using the tables of Example 1 as an example. The meanings of the signs in the tables of Examples 2 and 3 are basically similar to Example 1.

In the lens data of Table 1 and Table 2, the column of Si shows the surface numbers of i-th (i=1, 2, 3, surfaces. The surface number of the most object-side surface of elements is the first surface, and the surface numbers sequentially increase toward the image side. The column of Ri shows the curvature radius of the i-th surface. The column of Di shows a distance, on optical axis Z, between the i-th surface and the (i+1)th surface. The column of Ndi shows the refractive index of a medium between the i-th surface and the (i+1)th surface for d-line (wavelength is 587.6 nm), and the column of νdj shows the Abbe number of the j-th (j=1, 2, 3, optical element for d-line when the most object-side optical element is the first optical element, and the value of j sequentially increases toward the image side. Further, the column of θg,f shows partial dispersion ratio of each optical element.

The sign of a curvature radius is positive when the shape of a surface is convex toward the object side, and negative when the shape of a surface is convex toward the image side. The basic lens data include aperture stop St and optical member PP. In the column of surface numbers, the term "(STOP)" is written for a surface corresponding to aperture stop St together with the surface number.

In the lens data of Table 1 and Table 2, "DD[SURFACE NUMBER]" is written in each row of a surface distance that changes during magnification change. Data about variable magnification in Table 3 show a zoom magnification ratio (variable magnification ratio), focal length f, back focus Bf (distance in air), F-number Fno., full angle of view 2ω and the value of each surface distance about surfaces the distances of which change during magnification change at a wide angle end, in a middle focal length state and at a telephoto end.

Data about focus in Table 4 show the value of each surface distance about surfaces the distances of which change during magnification change at a wide angle end, in a middle focal length state and at a telephoto end.

In the basic lens data, the data about variable magnification and the data about focus, degree is used as the unit of angle, and mm is used as the unit of length. However, since an optical system can be used by proportionally enlarging or reducing the optical system, other appropriate units may be used.

In the lens data of Table 1, mark * is attached to the surface number of an aspherical surface. Table 1 shows, as the curvature radius of the aspherical surface, the numerical value of a paraxial curvature radius. The aspherical surface data in Table 5 and Table 6 show surface numbers Si of aspherical surfaces and aspheric coefficients about the aspherical surfaces. The aspheric coefficients are values of coefficients KA and Am (m=3, 4, 5 . . . 16) in an aspherical equation represented by the following equation (A):

$$Zd = C \cdot h^2 / \{1 + (1 - KA \cdot C^2 \cdot h^2)^{1/2}\} + \Sigma Am \cdot h^m \quad (A),$$ where Zd: depth of aspherical surface (the length of a perpendicular from a point on the aspherical surface at height h to a flat plane that contacts with the vertex of the aspherical surface and is perpendicular to the optical axis), h: height (the length from the optical axis to the lens surface), C: the reciprocal of paraxial curvature radius, and KA, Am: aspheric coefficients (m=3, 4, 5 . . . 16).

TABLE 1

EXAMPLE 1·BASIC LENS DATA

| Si (SURFACE NUMBER) | Ri (CURVATURE RADIUS) | Di (SURFACE DISTANCE) | Ndi (REFRACTIVE INDEX) | νdj (ABBE NUMBER) | θg, f (PARTIAL DISPERSION RATIO) |
|---|---|---|---|---|---|
| *1 | 671.7741 | 3.00 | 1.772499 | 49.60 | 0.55212 |
| 2 | 134.8384 | 11.75 | | | |
| 3 | −163.3426 | 1.90 | 1.799516 | 42.22 | 0.56727 |
| 4 | 210.1574 | DD[4] | | | |
| 5 | 139.4639 | 2.30 | 1.800000 | 29.84 | 0.60178 |
| 6 | 73.4230 | 15.03 | 1.496999 | 81.54 | 0.53748 |
| 7 | −176.7451 | DD[7] | | | |
| 8 | 98.0153 | 8.34 | 1.433871 | 95.20 | 0.53733 |
| 9 | −1700.9952 | 0.20 | | | |

TABLE 1-continued

EXAMPLE 1·BASIC LENS DATA

| Si (SURFACE NUMBER) | Ri (CURVATURE RADIUS) | Di (SURFACE DISTANCE) | Ndi (REFRACTIVE INDEX) | νdj (ABBE NUMBER) | θg, f (PARTIAL DISPERSION RATIO) |
|---|---|---|---|---|---|
| 10 | 91.1102 | 12.24 | 1.433871 | 95.20 | 0.53733 |
| 11 | −181.3469 | 0.20 | | | |
| *12 | 59.3608 | 7.58 | 1.772499 | 49.60 | 0.55212 |
| 13 | 144.5405 | DD[13] | | | |
| 14 | 30.0623 | 0.90 | 2.001003 | 29.13 | 0.59952 |
| 15 | 15.1723 | DD[15] | | | |
| 16 | 116.7085 | 0.80 | 1.882997 | 40.76 | 0.56679 |
| 17 | 25.2660 | 3.11 | | | |
| 18 | −211.5945 | 6.25 | 1.808095 | 22.76 | 0.63073 |
| 19 | −14.3520 | 0.80 | 1.816000 | 46.62 | 0.55682 |
| 20 | 92.0752 | 0.17 | | | |
| 21 | 29.5030 | 5.51 | 1.658441 | 50.88 | 0.55612 |
| 22 | −29.5030 | 0.90 | 1.882997 | 40.76 | 0.56679 |
| 23 | −546.6046 | DD[23] | | | |
| 24 | −25.8345 | 1.00 | 1.743997 | 44.78 | 0.56560 |
| 25 | 53.6380 | 2.46 | 1.922860 | 18.90 | 0.64960 |
| 26 | −868.6198 | DD[26] | | | |
| 27(STOP) | ∞ | 2.15 | | | |
| 28 | ∞ | 3.80 | 1.882997 | 40.76 | 0.56679 |
| 29 | −47.2624 | 0.13 | | | |
| 30 | 75.9172 | 7.14 | 1.583126 | 59.38 | 0.54345 |
| 31 | −27.8250 | 1.50 | 1.804000 | 46.58 | 0.55730 |
| 32 | −253.3002 | 31.47 | | | |
| 33 | 417.3315 | 4.82 | 1.696797 | 55.53 | 0.54341 |
| 34 | −43.5643 | 0.30 | | | |
| 35 | 41.4240 | 6.32 | 1.487490 | 70.23 | 0.53007 |
| 36 | −41.4240 | 1.60 | 1.882997 | 40.76 | 0.56679 |
| 37 | 33.7835 | 2.40 | | | |
| 38 | 34.1563 | 8.35 | 1.496999 | 81.54 | 0.53748 |
| 39 | −22.4200 | 1.50 | 1.806100 | 33.27 | 0.58845 |
| 40 | −244.3828 | 0.12 | | | |
| 41 | 75.8080 | 5.36 | 1.567322 | 42.82 | 0.57309 |
| 42 | −39.8974 | 0.20 | | | |
| 43 | ∞ | 1.00 | 1.516330 | 64.14 | 0.53531 |
| 44 | ∞ | 0.00 | | | |
| 45 | ∞ | 33.00 | 1.608589 | 46.44 | 0.56664 |
| 46 | ∞ | 13.20 | 1.516329 | 64.10 | 0.53463 |
| 47 | ∞ | 11.68 | | | |

TABLE 2

EXAMPLE 1·LENS DATA ABOUT EXTENDER LENS GROUP (INSERTED TO SURFACE NUMBER 32)

| Si (SURFACE NUMBER) | Ri (CURVATURE RADIUS) | Di (SURFACE DISTANCE) | Ndi (REFRACTIVE INDEX) | νdj (ABBE NUMBER) | θg, f (PARTIAL DISPERSION RATIO) |
|---|---|---|---|---|---|
| 32' | −253.3002 | 0.94 | | | |
| 48 | 29.5070 | 5.53 | 1.496999 | 81.54 | 0.53748 |
| 49 | −132.1700 | 0.12 | | | |
| 50 | 37.7687 | 3.92 | 1.438750 | 94.93 | 0.53433 |
| 51 | −210.4545 | 0.20 | | | |
| 52 | 28.1284 | 5.63 | 1.696797 | 55.53 | 0.54341 |
| 53 | −34.5600 | 0.80 | 1.846609 | 23.78 | 0.62072 |
| 54 | 24.2114 | 4.05 | | | |
| 55 | −61.1000 | 1.62 | 1.846609 | 23.78 | 0.62072 |
| 56 | −28.9950 | 0.77 | 1.816000 | 46.62 | 0.55682 |
| 57 | 9.1970 | 3.01 | 1.841390 | 24.56 | 0.61274 |
| 58 | 18.2375 | 4.88 | | | |

TABLE 3

EXAMPLE 1·DATA ABOUT VARIABLE MAGNIFICATION

|  |  | WIDE-ANGLE END | MIDDLE | TELE-PHOTO END |
|---|---|---|---|---|
|  | ZOOM MAGNIFICATION RATIO | 1.0 | 5.7 | 18.2 |
| BEFORE INSERTING Ext | f | 7.62 | 43.46 | 138.77 |
|  | Bf | 40.90 | 40.90 | 40.90 |
|  | FNo. | 1.87 | 1.87 | 2.71 |
|  | 2ω[°] | 74.64 | 14.22 | 4.53 |
| AFTER INSERTING Ext | f | 16.31 | 92.99 | 296.90 |
|  | FNo. | 4.13 | 4.13 | 5.82 |
|  | 2ω[°] | 37.52 | 6.73 | 2.12 |
|  | DD[13] | 0.80 | 37.85 | 45.09 |
|  | DD[15] | 7.68 | 11.68 | 14.68 |
|  | DD[23] | 49.52 | 5.74 | 5.56 |
|  | DD[26] | 9.60 | 12.33 | 1.27 |

TABLE 4

EXAMPLE 1·DATA ABOUT FOCUS

|  | inf | 3 m | 0.55 m |
|---|---|---|---|
| DD[4] | 1.01 | 3.83 | 14.49 |
| DD[7] | 14.08 | 11.27 | 0.60 |

TABLE 5

EXAMPLE 1·ASPHERICAL SURFACE DATA(1)

| SURFACE NUMBER | 1 |
|---|---|
| KA | −1.144658E+02 |
| A3 | 1.266635E−06 |
| A4 | −7.680904E−07 |
| A5 | 1.835455E−07 |
| A6 | −1.799087E−08 |
| A7 | 1.017818E−09 |
| A8 | −3.276256E−11 |
| A9 | 5.233524E−13 |
| A10 | −6.219345E−15 |
| A11 | 4.254304E−16 |
| A12 | −1.872576E−17 |
| A13 | 3.233753E−19 |
| A14 | −7.119809E−22 |
| A15 | −4.166246E−23 |
| A16 | 3.616030E−25 |

TABLE 6

EXAMPLE 1·ASPHERICAL SURFACE DATA(2)

| SURFACE NUMBER | 12 |
|---|---|
| KA | 9.454836E−01 |
| A3 | −4.681704E−07 |
| A4 | −8.801168E−08 |
| A5 | −2.733358E−08 |
| A6 | 6.617664E−10 |
| A7 | 5.655299E−11 |
| A8 | −4.406643E−12 |
| A9 | 4.336422E−14 |
| A10 | 3.637359E−15 |
| A11 | −1.252064E−17 |
| A12 | −6.278635E−18 |
| A13 | 1.083594E−19 |
| A14 | 3.928111E−21 |
| A15 | −1.431683E−22 |
| A16 | 1.282501E−24 |

TABLE 7

EXAMPLE 2·BASIC LENS DATA

| Si (SURFACE NUMBER) | Ri (CURVATURE RADIUS) | Di (SURFACE DISTANCE) | Ndi (REFRACTIVE INDEX) | ν dj (ABBE NUMBER) | θ g, f (PARTIAL DISPERSION RATIO) |
|---|---|---|---|---|---|
| *1 | 3050.5864 | 3.00 | 1.772499 | 49.60 | 0.55212 |
| 2 | 155.4752 | 10.53 |  |  |  |
| 3 | −183.0713 | 1.90 | 1.806098 | 40.92 | 0.57019 |
| 4 | 214.7203 | DD[4] |  |  |  |
| 5 | 135.6184 | 2.30 | 1.800000 | 29.84 | 0.60178 |
| 6 | 73.1906 | 14.48 | 1.496999 | 81.54 | 0.53748 |
| 7 | −204.5823 | DD[7] |  |  |  |
| 8 | 93.2267 | 9.30 | 1.433871 | 95.20 | 0.53733 |
| 9 | −1004.4591 | 0.15 |  |  |  |
| 10 | 86.7192 | 12.02 | 1.433871 | 95.20 | 0.53733 |
| 11 | −225.9939 | 0.15 |  |  |  |
| *12 | 61.5434 | 7.63 | 1.772499 | 49.60 | 0.55212 |
| 13 | 160.2760 | DD[13] |  |  |  |
| 14 | 32.0360 | 0.80 | 2.001003 | 29.13 | 0.59952 |
| 15 | 15.6085 | DD[15] |  |  |  |
| 16 | 122.1226 | 0.80 | 1.882997 | 40.76 | 0.56679 |
| 17 | 24.5558 | 3.08 |  |  |  |
| 18 | −263.9081 | 5.83 | 1.808095 | 22.76 | 0.63073 |
| 19 | −14.7147 | 0.80 | 1.816000 | 46.62 | 0.55682 |
| 20 | 62.2098 | 0.12 |  |  |  |
| 21 | 29.0602 | 5.82 | 1.658441 | 50.88 | 0.55612 |
| 22 | −27.6414 | 0.90 | 1.882997 | 40.76 | 0.56679 |
| 23 | −109.3731 | DD[23] |  |  |  |
| 24 | −23.7371 | 1.00 | 1.743997 | 44.78 | 0.56560 |
| 25 | 54.1151 | 2.18 | 1.922860 | 18.90 | 0.64960 |
| 26 | −469.8193 | DD[26] |  |  |  |
| 27(STOP) | ∞ | 1.99 |  |  |  |

TABLE 7-continued

EXAMPLE 2·BASIC LENS DATA

| Si (SURFACE NUMBER) | Ri (CURVATURE RADIUS) | Di (SURFACE DISTANCE) | Ndi (REFRACTIVE INDEX) | νdj (ABBE NUMBER) | θg,f (PARTIAL DISPERSION RATIO) |
|---|---|---|---|---|---|
| 28 | −363.1046 | 3.58 | 1.882997 | 40.76 | 0.56679 |
| 29 | −43.9952 | 0.20 | | | |
| 30 | 93.7337 | 7.07 | 1.589130 | 61.14 | 0.54067 |
| 31 | −25.6186 | 1.50 | 1.772499 | 49.60 | 0.55212 |
| 32 | −146.0468 | 31.89 | | | |
| 33 | 390.3807 | 5.21 | 1.696797 | 55.53 | 0.54341 |
| 34 | −40.8550 | 0.71 | | | |
| 35 | 61.8917 | 6.39 | 1.487490 | 70.23 | 0.53007 |
| 36 | −32.4830 | 1.60 | 1.882997 | 40.76 | 0.56679 |
| 37 | 59.4043 | 2.67 | | | |
| 38 | 72.0074 | 7.28 | 1.496999 | 81.54 | 0.53748 |
| 39 | −20.2283 | 1.50 | 1.800000 | 29.84 | 0.60178 |
| 40 | −134.4753 | 1.03 | | | |
| 41 | 81.8770 | 5.74 | 1.581439 | 40.75 | 0.57757 |
| 42 | −37.2180 | 0.20 | | | |
| 43 | ∞ | 1.00 | 1.516330 | 64.14 | 0.53531 |
| 44 | ∞ | 0.00 | | | |
| 45 | ∞ | 33.00 | 1.608589 | 46.44 | 0.56664 |
| 46 | ∞ | 13.20 | 1.516329 | 64.10 | 0.53463 |
| 47 | ∞ | 10.51 | | | |

TABLE 8

EXAMPLE 2·LENS DATA ABOUT EXTENDER LENS GROUP (INSERTED TO SURFACE NUMBER 32)

| Si (SURFACE NUMBER) | Ri (CURVATURE RADIUS) | Di (SURFACE DISTANCE) | Ndi (REFRACTIVE INDEX) | νdj (ABBE NUMBER) | θg,f (PARTIAL DISPERSION RATIO) |
|---|---|---|---|---|---|
| 32' | −144.0941 | 0.84 | | | |
| 48 | 30.9183 | 5.13 | 1.438750 | 94.93 | 0.53433 |
| 49 | −108.7644 | 0.12 | | | |
| 50 | 33.5919 | 3.68 | 1.496999 | 81.54 | 0.53748 |
| 51 | −581.7041 | 0.12 | | | |
| 52 | 31.4273 | 4.13 | 1.651597 | 58.55 | 0.54267 |
| 53 | −56.9504 | 0.75 | 1.846609 | 23.78 | 0.62072 |
| 54 | 26.6162 | 8.32 | | | |
| 55 | −54.3102 | 1.79 | 1.841390 | 24.56 | 0.61274 |
| 56 | −17.6222 | 0.75 | 1.788001 | 47.37 | 0.55598 |
| 57 | 11.0326 | 1.58 | 1.841390 | 24.56 | 0.61274 |
| 58 | 18.9267 | 3.56 | | | |

TABLE 9

EXAMPLE 2·DATA ABOUT VARIABLE MAGNIFICATION

| | | WIDE-ANGLE END | MIDDLE | TELE-PHOTO END |
|---|---|---|---|---|
| | ZOOM MAGNIFICATION RATIO | 1.0 | 5.7 | 18.3 |
| BEFORE INSERTING Ext | f | 7.63 | 43.62 | 139.55 |
| | Bf | 39.73 | 39.73 | 39.73 |
| | FNo. | 1.87 | 1.87 | 2.71 |
| | 2ω[°] | 74.72 | 14.17 | 4.50 |
| AFTER INSERTING Ext | f | 16.36 | 93.57 | 299.35 |
| | FNo. | 4.16 | 4.15 | 5.84 |
| | 2ω[°] | 37.40 | 6.68 | 2.10 |
| | DD[13] | 0.80 | 37.29 | 45.23 |
| | DD[15] | 7.57 | 11.87 | 14.57 |
| | DD[23] | 47.17 | 4.86 | 5.92 |
| | DD[26] | 11.27 | 12.79 | 1.09 |

TABLE 10

EXAMPLE 2·DATA ABOUT FOCUS

| | inf | 3 m | 0.55 m |
|---|---|---|---|
| DD[4] | 1.00 | 3.92 | 14.97 |
| DD[7] | 14.56 | 11.64 | 0.59 |

TABLE 11

EXAMPLE 2·ASPHERICAL SURFACE DATA(1)

| SURFACE NUMBER | 1 |
|---|---|
| KA | −5.262102E+01 |
| A3 | 6.135394E−06 |
| A4 | −1.912099E−06 |
| A5 | 3.581788E−07 |
| A6 | −3.620900E−08 |
| A7 | 2.255732E−09 |
| A8 | −8.664234E−11 |

TABLE 11-continued

EXAMPLE 2•ASPHERICAL SURFACE DATA(1)

| SURFACE NUMBER | 1 |
|---|---|
| A9 | 1.804878E-12 |
| A10 | -5.184862E-15 |
| A11 | -7.177154E-16 |
| A12 | 1.652403E-17 |
| A13 | -7.702174E-20 |
| A14 | -2.263286E-21 |
| A15 | 3.616382E-23 |
| A16 | -1.593202E-25 |

TABLE 12

EXAMPLE 2•ASPHERICAL SURFACE DATA(2)

| SURFACE NUMBER | 12 |
|---|---|
| KA | 9.081935E-01 |
| A3 | -2.477106E-06 |
| A4 | 2.140590E-07 |
| A5 | -6.038367E-08 |
| A6 | 2.788475E-09 |
| A7 | -2.948957E-11 |
| A8 | -2.335875E-12 |
| A9 | 4.727046E-14 |
| A10 | 1.499832E-15 |
| A11 | -1.279279E-17 |
| A12 | -2.048021E-18 |
| A13 | 2.914842E-20 |
| A14 | 8.483422E-22 |
| A15 | -2.099252E-23 |
| A16 | 1.087785E-25 |

TABLE 13

EXAMPLE 3•BASIC LENS DATA

| Si (SURFACE NUMBER) | Ri (CURVATURE RADIUS) | Di (SURFACE DISTANCE) | Ndi (REFRACTIVE INDEX) | ν dj (ABBE NUMBER) | θ g, f (PARTIAL DISPERSION RATIO) |
|---|---|---|---|---|---|
| 1 | -427.4623 | 2.40 | 1.755199 | 27.51 | 0.61033 |
| 2 | 92.1360 | 11.75 | 1.438750 | 94.93 | 0.53433 |
| 3 | -295.8081 | 0.15 | | | |
| 4 | 382.8176 | 4.99 | 1.496999 | 81.54 | 0.53748 |
| 5 | -382.8176 | DD[5] | | | |
| 6 | 93.4472 | 8.08 | 1.729157 | 54.68 | 0.54451 |
| 7 | ∞ | 0.12 | | | |
| 8 | 67.7042 | 5.33 | 1.804000 | 46.57 | 0.55724 |
| 9 | 135.1389 | DD[9] | | | |
| 10 | 62.5508 | 0.82 | 1.834807 | 42.71 | 0.56369 |
| 11 | 13.8139 | 5.68 | | | |
| 12 | -48.5431 | 0.82 | 1.834807 | 42.71 | 0.56369 |
| 13 | 37.3173 | 1.34 | | | |
| 14 | 25.8463 | 5.81 | 1.846660 | 23.78 | 0.62054 |
| 15 | -35.1569 | 0.51 | | | |
| 16 | -26.6573 | 0.90 | 1.882997 | 40.76 | 0.56679 |
| 17 | 172.8186 | DD[17] | | | |
| 18 | -28.4220 | 0.90 | 1.743198 | 49.34 | 0.55312 |
| 19 | 45.1100 | 2.85 | 1.846660 | 23.78 | 0.62054 |
| 20 | ∞ | DD[20] | | | |
| 21(STOP) | ∞ | 2.41 | | | |
| 22 | 111.0172 | 5.25 | 1.603112 | 60.64 | 0.54148 |
| 23 | -38.9571 | 0.12 | | | |
| 24 | 505.0781 | 2.50 | 1.808095 | 22.76 | 0.63073 |
| 25 | -115.0534 | 0.12 | | | |
| 26 | 79.8859 | 6.81 | 1.487490 | 70.23 | 0.53007 |
| 27 | -31.9650 | 1.20 | 1.903658 | 31.32 | 0.59481 |
| 28 | -299.1855 | 34.24 | | | |
| 29 | 119.8789 | 5.20 | 1.518229 | 58.90 | 0.54567 |
| 30 | -46.5487 | 0.23 | | | |
| 31 | 40.5810 | 7.03 | 1.487490 | 70.23 | 0.53007 |
| 32 | -40.5810 | 1.30 | 1.834807 | 42.73 | 0.56486 |
| 33 | 27.3325 | 1.29 | | | |
| 34 | 30.5064 | 10.01 | 1.516330 | 64.14 | 0.53531 |
| 35 | -24.3440 | 1.25 | 1.834000 | 37.16 | 0.57759 |
| 36 | -199.8071 | 0.12 | | | |
| 37 | 65.5161 | 6.32 | 1.567322 | 42.82 | 0.57309 |
| 38 | -38.7846 | 0.00 | | | |
| 39 | ∞ | 33.00 | 1.608589 | 46.44 | 0.56664 |
| 40 | ∞ | 13.20 | 1.516329 | 64.10 | 0.53463 |
| 41 | ∞ | 10.48 | | | |

TABLE 14

EXAMPLE 3•LENS DATA ABOUT EXTENDER
LENS GROUP (INSERTED TO SURFACE NUMBER 28)

| Si (SURFACE NUMBER) | Ri (CURVATURE RADIUS) | Di (SURFACE DISTANCE) | Ndi (REFRACTIVE INDEX) | ν dj (ABBE NUMBER) | θ g, f (PARTIAL DISPERSION RATIO) |
|---|---|---|---|---|---|
| 28' | −299.1855 | 1.20 | | | |
| 42 | 32.9142 | 5.00 | 1.603001 | 65.44 | 0.54022 |
| 43 | −243.7166 | 0.13 | | | |
| 44 | 35.0771 | 4.78 | 1.496999 | 81.54 | 0.53748 |
| 45 | −108.5553 | 0.13 | | | |
| 46 | 94.5782 | 4.05 | 1.639999 | 60.08 | 0.53704 |
| 47 | −30.9700 | 1.10 | 1.846609 | 23.78 | 0.62072 |
| 48 | 51.3610 | 3.84 | | | |
| 49 | −62.6915 | 2.76 | 1.784723 | 25.68 | 0.61621 |
| 50 | −19.0770 | 1.11 | 1.772499 | 49.60 | 0.55212 |
| 51 | 10.9250 | 2.78 | 1.841390 | 24.56 | 0.61274 |
| 52 | 18.6871 | 7.37 | | | |

TABLE 15

EXAMPLE 3•DATA ABOUT VARIABLE MAGNIFICATION

| | | WIDE-ANGLE END | MIDDLE | TELE-PHOTO END |
|---|---|---|---|---|
| | ZOOM MAGNIFICATION RATIO | 1.0 | 5.9 | 19.2 |
| BEFORE INSERTING Ext | f | 8.88 | 52.40 | 170.51 |
| | Bf | 39.70 | 39.70 | 39.70 |
| | FNo. | 1.89 | 1.89 | 2.78 |
| | 2ω[°] | 66.54 | 11.77 | 3.65 |
| AFTER INSERTING Ext | f | 17.22 | 101.62 | 330.71 |
| | FNo. | 3.76 | 3.76 | 5.39 |
| | 2ω[°] | 36.05 | 6.15 | 1.90 |
| | DD[9] | 0.85 | 41.40 | 51.96 |
| | DD[17] | 54.34 | 7.85 | 6.37 |
| | DD[20] | 3.88 | 9.82 | 0.73 |

*VARIATION DOES NOT CHANGE FROM WIDE-ANGLE END EVEN WHEN OBJECT DISTANCE IS FINITE

TABLE 16

EXAMPLE 3•DATA ABOUT FOCUS

| | inf | 3 m | 0.9 m |
|---|---|---|---|
| DD[5] | 7.07 | 5.26 | 0.71 |
| DD[9] | 0.85 | 2.65 | 7.20 |

*VARIATION FROM OBJECT DISTANCE INF DOES NOT CHANGE EVEN AT POSITION OTHER THAN WIDE-ANGLE END

Table 17 shows values corresponding to conditional formulas (1) through (5) for the variable magnification optical systems in Examples 1 through 3. In all of the examples, d-line is a reference wavelength. Values in the tables of data at the aforementioned variable magnification and the following Table 17 are values at the reference wavelength.

TABLE 17

| FORMULA NUMBER | CONDITIONAL FORMULA | EXAMPLE 1 | EXAMPLE 2 | EXAMPLE 3 |
|---|---|---|---|---|
| (1) | 1.7 < n213 | 1.84400 | 1.84139 | 1.81305 |
| (2) | 1.7 < n22 | 1.81600 | 1.78800 | 1.77250 |
| (3) | ν 213 < 30 | 24.2 | 24.6 | 25.1 |
| (4) | 40 < ν 22 | 46.6 | 47.4 | 49.6 |
| (5) | 65 < ν 1p | 77.3 | 78.3 | 69.0 |

Figure 10:
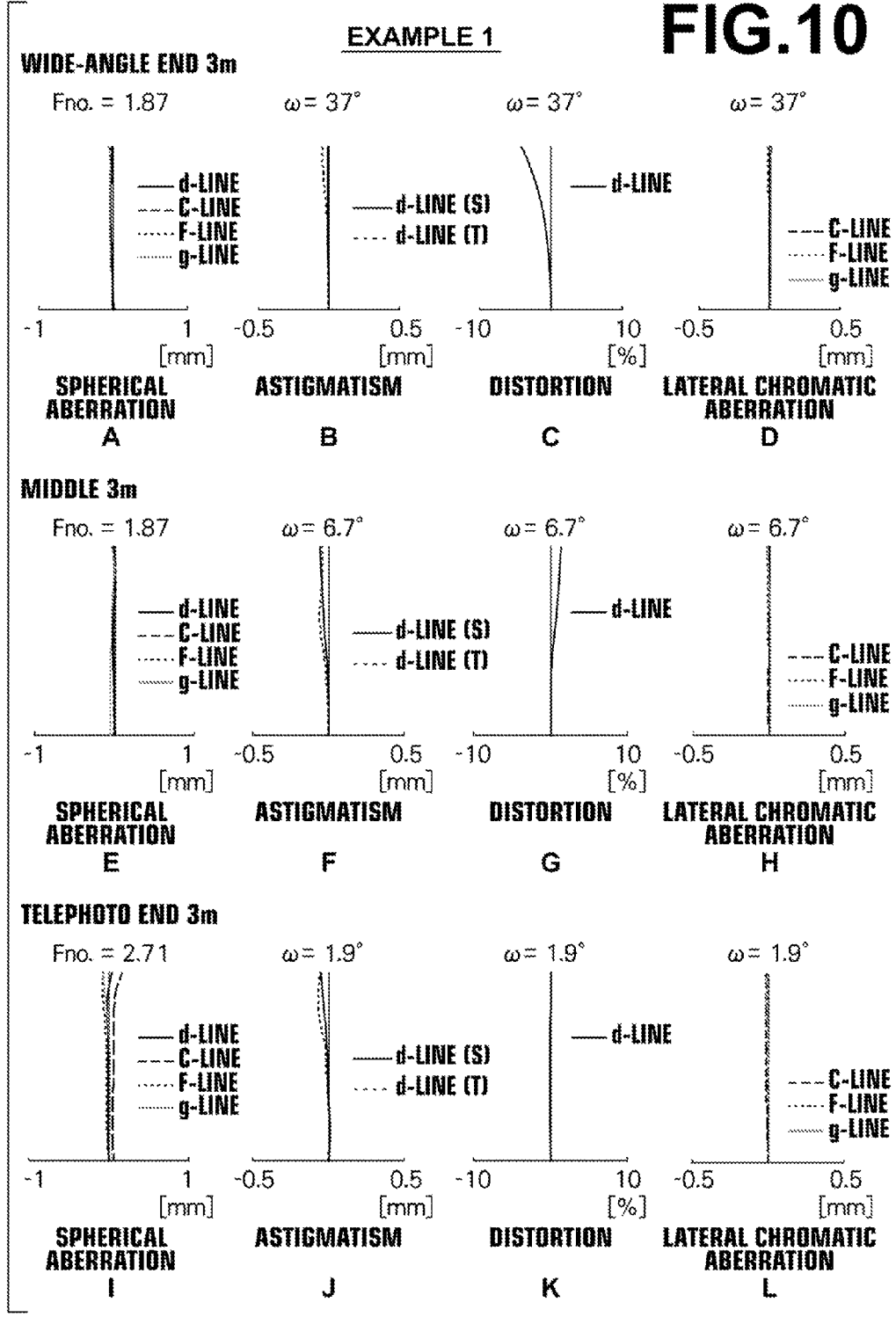
FIG. 10, Sections A through L are aberration diagrams of the variable magnification optical system in Example 1 of the present invention before the extender lens group is inserted.

FIG. 10, Sections A through L show aberration diagrams of the variable magnification optical system in Example 1 before an extender lens group is inserted. FIG. 10, Sections A, B, C and D illustrate a spherical aberration, astigmatism, distortion aberration (distortion) and a lateral chromatic aberration at a wide-angle end, respectively. FIG. 10, Sections E, F, G and H illustrate a spherical aberration, astigmatism, distortion aberration (distortion) and a lateral chromatic aberration in a middle focal length state, respectively. FIG. 10, Sections I, J, K and L illustrate a spherical aberration, astigmatism, distortion aberration (distortion) and a lateral chromatic aberration at a telephoto end, respectively.

Similarly, FIG. 11, Sections A through L show aberration diagrams of the variable magnification optical system in Example 1 after the extender lens group is inserted at a wide angle end, in a middle focal length state and at a telephoto end.

Each aberration diagram illustrating the spherical aberration, astigmatism and distortion (distortion aberration) shows an aberration when d-line (wavelength is 587.6 nm) is a reference wavelength. In the diagram of the spherical aberration and the diagram of the lateral chromatic aberration, a solid line, a long broken line, a short broken line and a gray line indicate aberrations for d-line (wavelength is 587.6 nm), C-line (wavelength is 656.3 nm), F-line (wavelength is 486.1 nm) and g-line (wavelength is 435.8 nm), respectively. In the diagram of the astigmatism, an aberration in a sagittal direction and an aberration in a tangential direction are indicated by a solid line and a broken line, respectively. In the diagram of the spherical aberration, Fno. represents an F-number. In the other diagrams, ω represents a half angle of view.

Figure 12:
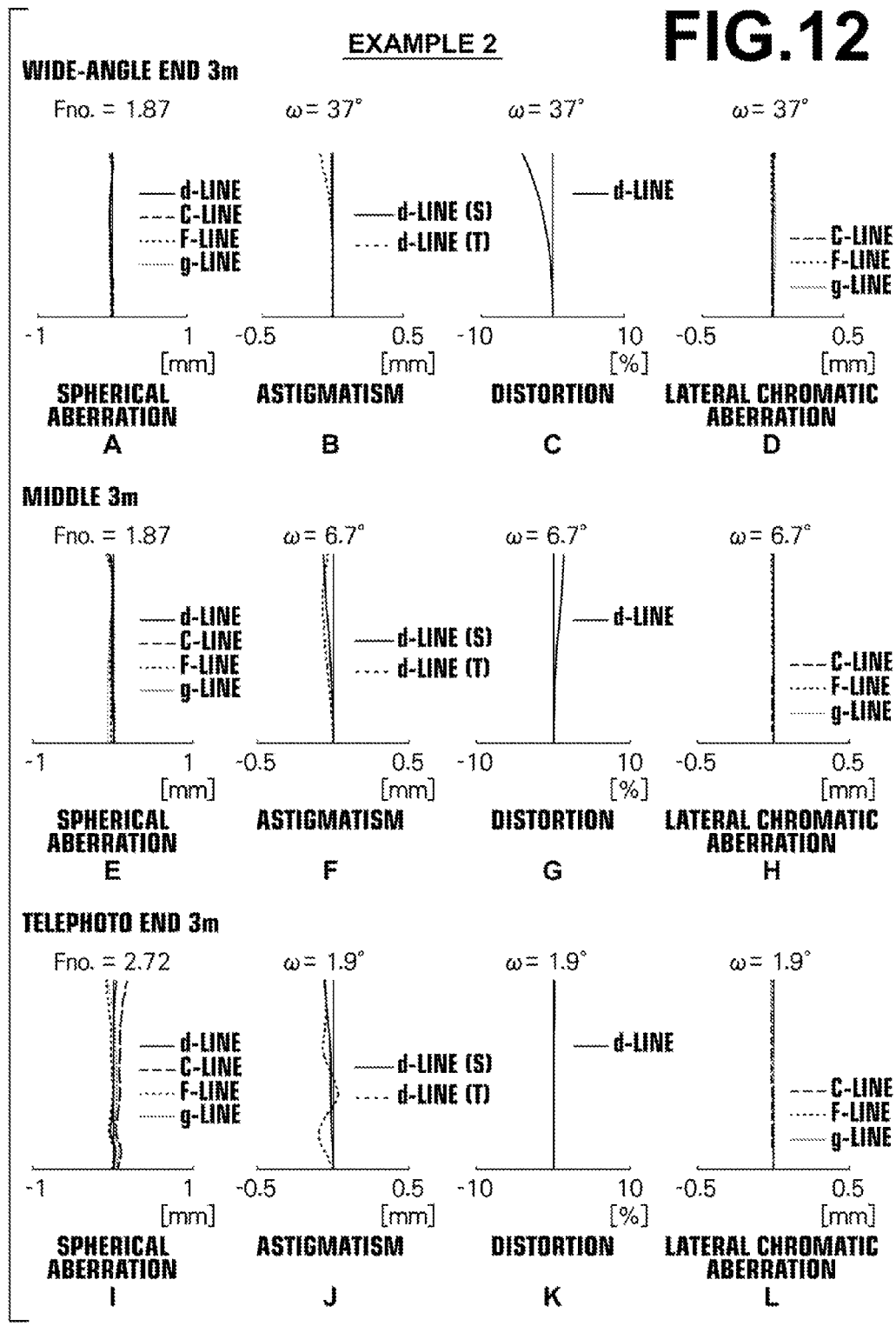
FIG. 12, Sections A through L are aberration diagrams of the variable magnification optical system in Example 2 of the present invention before the extender lens group is inserted.

Similarly, FIG. 12, Sections A through L show aberration diagrams of the variable magnification optical system in Example 2 before an extender lens group is inserted at a wide-angle end, in a middle focal length state, and at a telephoto end. FIG. 13, Sections A through L show aberration diagrams of the variable magnification optical system in Example 2 after the extender lens group is inserted at a wide-angle end, in a middle focal length state, and at a telephoto end.

Figure 14:
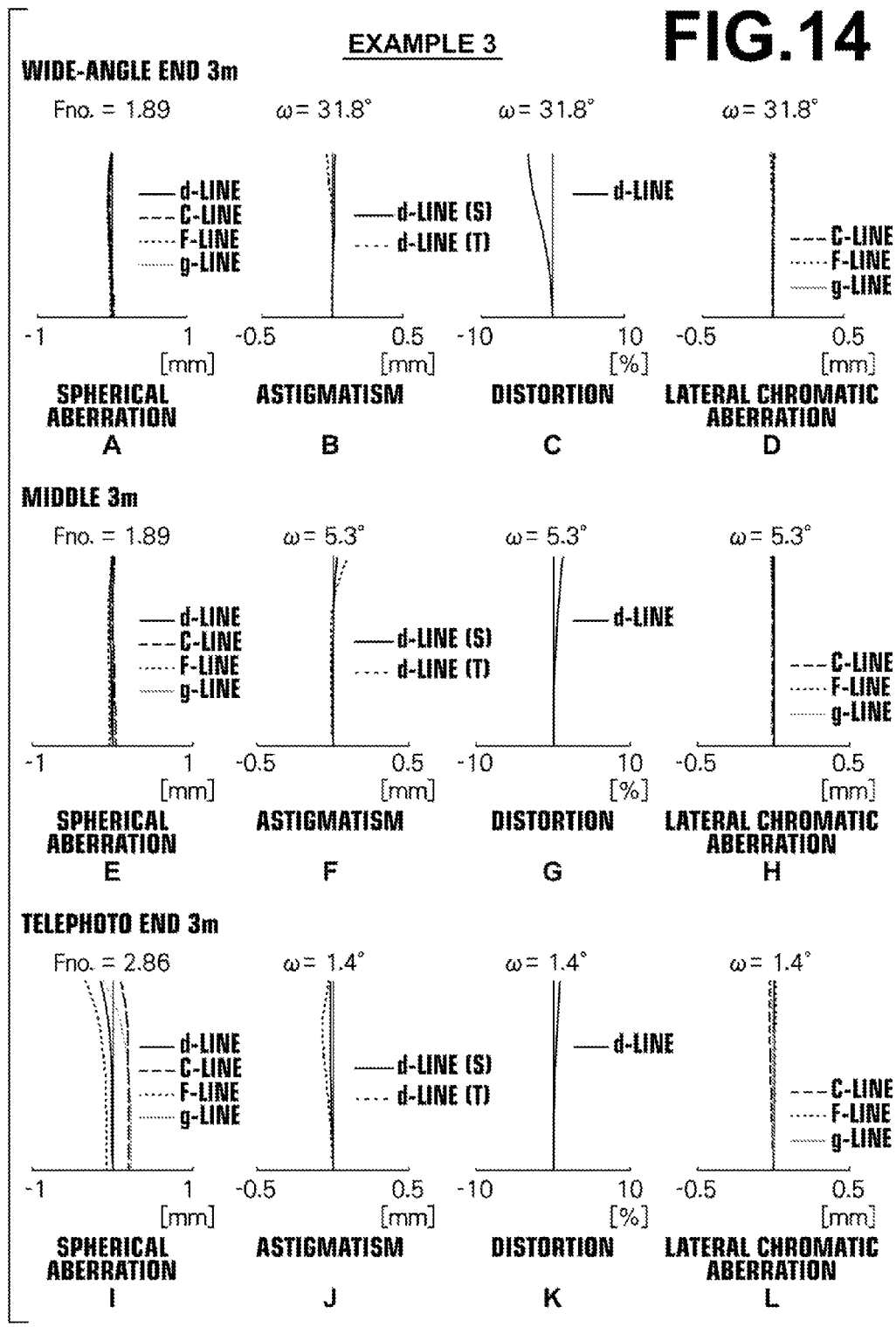
FIG. 14, Sections A through L are aberration diagrams of the variable magnification optical system in Example 3 of the present invention before the extender lens group is inserted.

Further, FIG. 14, Sections A through L show aberration diagrams of the variable magnification optical system in Example 3 before an extender lens group is inserted at a wide-angle end, in a middle focal length state, and at a telephoto end. FIG. 15, Sections A through L show aberration diagrams of the variable magnification optical system in Example 3 after the extender lens group is inserted at a wide-angle end, in a middle focal length state, and at a telephoto end.

As these kinds of data show, all of the variable magnification optical systems in Examples 1 through 3 satisfy conditional formulas (1) through (5). It is recognized that they can excellently suppress lateral chromatic aberrations that increase in the entire zoom range when a focal length is extended toward a telephoto side by inserting extender lens group Ext.

Figure 16:
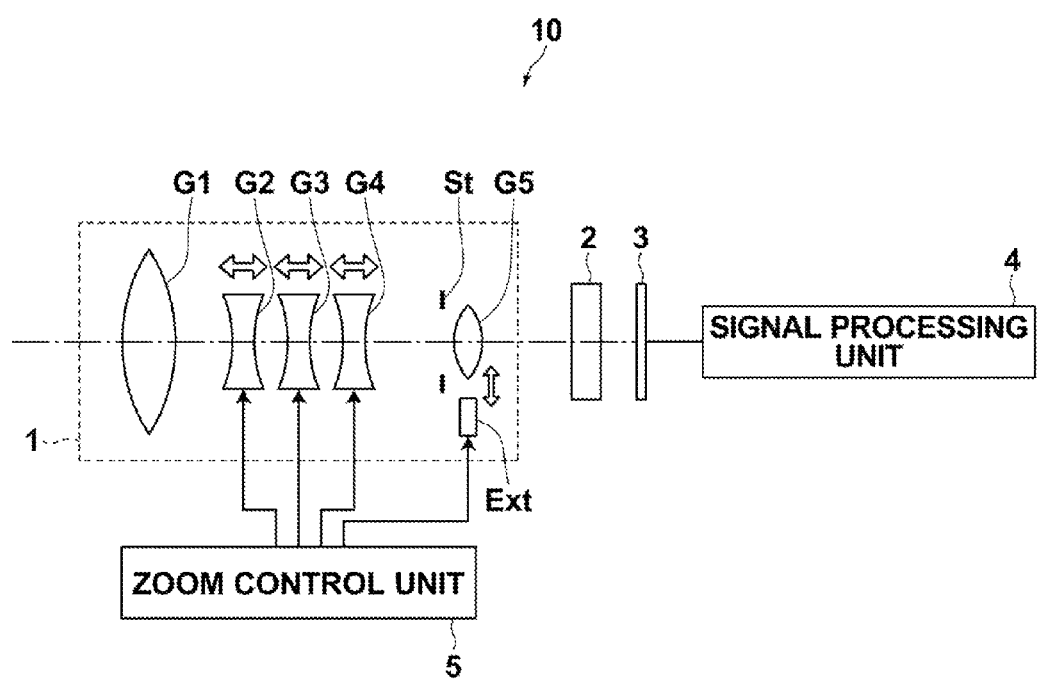
FIG. 16 is a schematic diagram illustrating the configuration of an imaging apparatus according to an embodiment of the present invention.

Next, an imaging apparatus according to an embodiment of the present invention will be described. FIG. 16 is a schematic diagram illustrating the configuration of an imaging apparatus using the variable magnification optical system according to an embodiment of the present invention, as an example of an imaging apparatus according to an embodiment of the present invention. The imaging apparatus is, for example, a surveillance camera, a video camera, an electronic still camera or the like using a solid-state imaging device, such as a CCD and a CMOS, as a recording medium.

An imaging apparatus 10 illustrated in FIG. 16 includes the variable magnification optical system 1, a filter 2 arranged on the image side of the variable magnification optical system 1, an imaging device 3 that images an image of a subject formed by the variable magnification optical system, a signal processing unit 4 that performs operation processing on a signal output from the imaging device 3, and a zoom control unit 5 for performing magnification change of the variable magnification optical system 1, focus adjustment necessitated by the magnification change, and insertion/detachment control of extender lens group Ext.

The variable magnification optical system 1 includes first lens group G1 having positive refractive power, and which is fixed during magnification change, second lens group G2 having negative refractive power, and which moves during magnification change, third lens group G3 having negative refractive power, and which moves during magnification change, fourth lens group G4 having negative refractive power, and which moves during magnification change, aperture stop St, which is fixed during magnification change, and fifth lens group G5 having positive refractive power, and which is fixed during magnification change, which are in this order from an object side. Further, it is possible to insertably and detachably arrange extender lens group Ext in fifth lens group G5, which is a relay lens group.

In FIG. 16, each lens group is schematically illustrated. The imaging device 3 converts an optical image formed by the variable magnification optical system 1 into electrical signals. The imaging device 3 is arranged in such a manner that the imaging surface of the imaging device 3 is located at the same position as the image plane of the variable magnification optical system. For example, a CCD, a CMOS or the like may be used as the imaging device 3.

So far, the present invention has been described by using embodiments and examples. However, the present invention is not limited to the embodiments nor the examples, and various modifications are possible. For example, values, such as the curvature radius of each lens element, distances between surfaces, refractive indices, Abbe numbers and aspheric coefficients, are not limited to the values in the numerical value examples, but may be other values.

What is claimed is:

1. A variable magnification optical system comprising:
    a relay lens group comprising a relay front group and a relay rear group with a predetermined air space therebetween, and which is fixed during magnification change and has image formation; and
    an extender lens group insertably and detachably arranged between the relay front group and the relay rear group, and which extends a focal length toward a telephoto side without changing an image formation position,
    wherein the extender lens group substantially consists of a first lens group EG1 having positive refractive power and a second lens group EG2 having negative refractive power in this order from an object side,
    wherein the second lens group EG2 is a cemented lens substantially consisting of a convex meniscus lens EL21, a biconcave lens EL22 and a convex meniscus lens EL23 in this order from the object side,
    wherein the first lens group EG1 comprises a biconvex lens EL11 having strong refractive power toward the object side, a positive lens EL12, a positive lens EL13 and a biconcave lens EL14 in this order from the object side, and
    wherein the positive lens EL13 and the biconcave lens EL14 are cemented together.

2. The variable magnification optical system, as defined in claim 1, wherein the following conditional formulas (1) and (2) are satisfied when an average refractive index of the convex meniscus lens EL21 and the convex meniscus lens EL23 is n213 and the refractive index of the biconcave lens EL22 is n22:

$$1.7 < n213 \tag{1; and}$$

$$1.7 < n22 \tag{2}.$$

3. The variable magnification optical system, as defined in claim 2, wherein the following conditional formula (1-1) is satisfied:

$$1.7 < n213 < 1.9 \tag{1-1}.$$

4. The variable magnification optical system, as defined in claim 1, wherein the following conditional formulas (3) and (4) are satisfied when an average Abbe number of the convex meniscus lens EL21 and the convex meniscus lens EL23 is ν213 and the Abbe number of the biconcave lens EL22 is ν22:

$$\nu 213 < 30 \tag{3; and}$$

$$40 < \nu 22 \tag{4}.$$

5. An optical apparatus comprising:
    the variable magnification optical system, as defined in claim 1.

6. The variable magnification optical system, as defined in claim 1, wherein the following conditional formula (5) is satisfied when an average Abbe number of the biconvex lens EL11, the positive lens EL12 and the positive lens EL13 is ν1p:

$$65 < \nu 1 p \tag{5}.$$

7. A variable magnification optical system comprising:
    a relay lens group comprising a relay front group and a relay rear group with a predetermined air space therebetween, and which is fixed during magnification change and has image formation; and
    an extender lens group insertably and detachably arranged between the relay front group and the relay rear group, and which extends a focal length toward a telephoto side without changing an image formation position,
    wherein the extender lens group substantially consists of a first lens group EG1 having positive refractive power and a second lens group EG2 having negative refractive power in this order from an object side,
    wherein the second lens group EG2 is a cemented lens substantially consisting of a convex meniscus lens EL21, a biconcave lens EL22 and a convex meniscus lens EL23 in this order from the object side, and wherein the following conditional formula (5) is satisfied when an average Abbe number of the biconvex lens EL11, the positive lens EL12 and the positive lens EL13 is ν1p:

$$65 < \nu 1p \quad (5).$$

8. The variable magnification optical system, as defined in claim 7, wherein the following conditional formulas (1) and (2) are satisfied when an average refractive index of the convex meniscus lens EL21 and the convex meniscus lens EL23 is n213 and the refractive index of the biconcave lens EL22 is n22:

$$1.7 < n213 \quad (1); \text{ and}$$

$$1.7 < n22 \quad (2).$$

9. The variable magnification optical system, as defined in claim 8, wherein the following conditional formula (1-1) is satisfied:

$$1.7 < n213 < 1.9 \quad (1\text{-}1).$$

10. The variable magnification optical system, as defined in claim 7, wherein the following conditional formulas (3) and (4) are satisfied when an average Abbe number of the convex meniscus lens EL21 and the convex meniscus lens EL23 is ν213 and the Abbe number of the biconcave lens EL22 is ν22:

$$\nu 213 < 30 \quad (3); \text{ and}$$

$$40 < \nu 22 \quad (4).$$

11. The variable magnification optical system, as defined in claim 7, wherein the first lens group EG1 substantially consists of a biconvex lens EL11 having strong refractive power toward the object side, a positive lens EL12, a positive lens EL13 and a biconcave lens EL14 in this order from the object side, and wherein the positive lens EL13 and the biconcave lens EL14 are cemented together.

12. An optical apparatus comprising:

the variable magnification optical system, as defined in claim 7.

* * * * *